United States Patent
Aoba et al.

(10) Patent No.: US 8,588,974 B2
(45) Date of Patent: Nov. 19, 2013

(54) WORK APPARATUS AND CALIBRATION METHOD FOR THE SAME

(75) Inventors: Masato Aoba, Tokyo (JP); Shunta Tate, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 398 days.

(21) Appl. No.: 12/641,246

(22) Filed: Dec. 17, 2009

(65) Prior Publication Data

US 2010/0161125 A1 Jun. 24, 2010

(30) Foreign Application Priority Data

Dec. 24, 2008 (JP) ................................. 2008-328661

(51) Int. Cl.
*G05B 19/418* (2006.01)
*G05B 19/04* (2006.01)
*G05B 19/00* (2006.01)

(52) U.S. Cl.
USPC ........... 700/248; 700/194; 700/245; 700/251; 700/252; 700/254; 700/255; 700/259; 700/262; 700/264

(58) Field of Classification Search
None
See application file for complete search history.

(56) References Cited

U.S. PATENT DOCUMENTS

| | | | | |
|---|---|---|---|---|
| 5,960,125 A * | 9/1999 | Michael et al. | ................ | 382/294 |
| 6,141,863 A * | 11/2000 | Hara et al. | ........................ | 29/714 |
| 6,167,325 A * | 12/2000 | Kamiguchi et al. | ........... | 700/183 |
| 6,349,245 B1 * | 2/2002 | Finlay | ............................ | 700/245 |
| 6,775,586 B2 * | 8/2004 | Shibata et al. | ................. | 700/189 |
| 6,836,702 B1 * | 12/2004 | Brogårdh et al. | .............. | 700/245 |
| 7,149,602 B2 * | 12/2006 | Watanabe et al. | .............. | 700/245 |
| 7,181,315 B2 * | 2/2007 | Watanabe et al. | .............. | 700/264 |
| 7,532,949 B2 | 5/2009 | Ban et al. | ........................ | 700/245 |
| 7,643,905 B2 * | 1/2010 | Watanabe et al. | .............. | 700/253 |
| 2003/0090483 A1 * | 5/2003 | Watanabe et al. | .............. | 345/419 |
| 2003/0200042 A1 * | 10/2003 | Gan et al. | ....................... | 702/105 |
| 2004/0199288 A1 * | 10/2004 | Watanabe et al. | .............. | 700/245 |
| 2005/0107918 A1 * | 5/2005 | Watanabe et al. | .............. | 700/245 |
| 2005/0159842 A1 * | 7/2005 | Ban et al. | ........................ | 700/245 |
| 2005/0273199 A1 * | 12/2005 | Ban et al. | ........................ | 700/248 |
| 2006/0018539 A1 * | 1/2006 | Sato et al. | ....................... | 382/173 |

FOREIGN PATENT DOCUMENTS

| | | |
|---|---|---|
| JP | 05-280927 | 10/1993 |
| JP | 10-103937 | 4/1998 |
| JP | 11-123678 | 5/1999 |
| JP | 3239277 | 12/2001 |
| JP | 2005-271103 | 10/2005 |
| JP | 4021413 | 12/2007 |

* cited by examiner

*Primary Examiner* — Ian Jen
(74) *Attorney, Agent, or Firm* — Fitzpatrick, Cella, Harper & Scinto

(57) ABSTRACT

A work apparatus sets a virtual target point on an image plane in an imaging apparatus, and obtains a plurality of coordinate values of a moving unit at which a work reference point of a work unit and the virtual target point are caused to match in an image captured by the imaging apparatus. Further, the work apparatus obtains, in the image, coordinate values of the moving unit at which a position of light projection by a distance information obtaining unit and the virtual target point are caused to match, and a plurality of pieces of distance information obtained from the distance information obtaining unit at those coordinate positions. Then, the work apparatus calculates, based on the plurality of coordinate values and the plurality of pieces of distance information obtained through the above processing, a calibration parameter for the moving unit and the distance information obtaining unit.

13 Claims, 12 Drawing Sheets

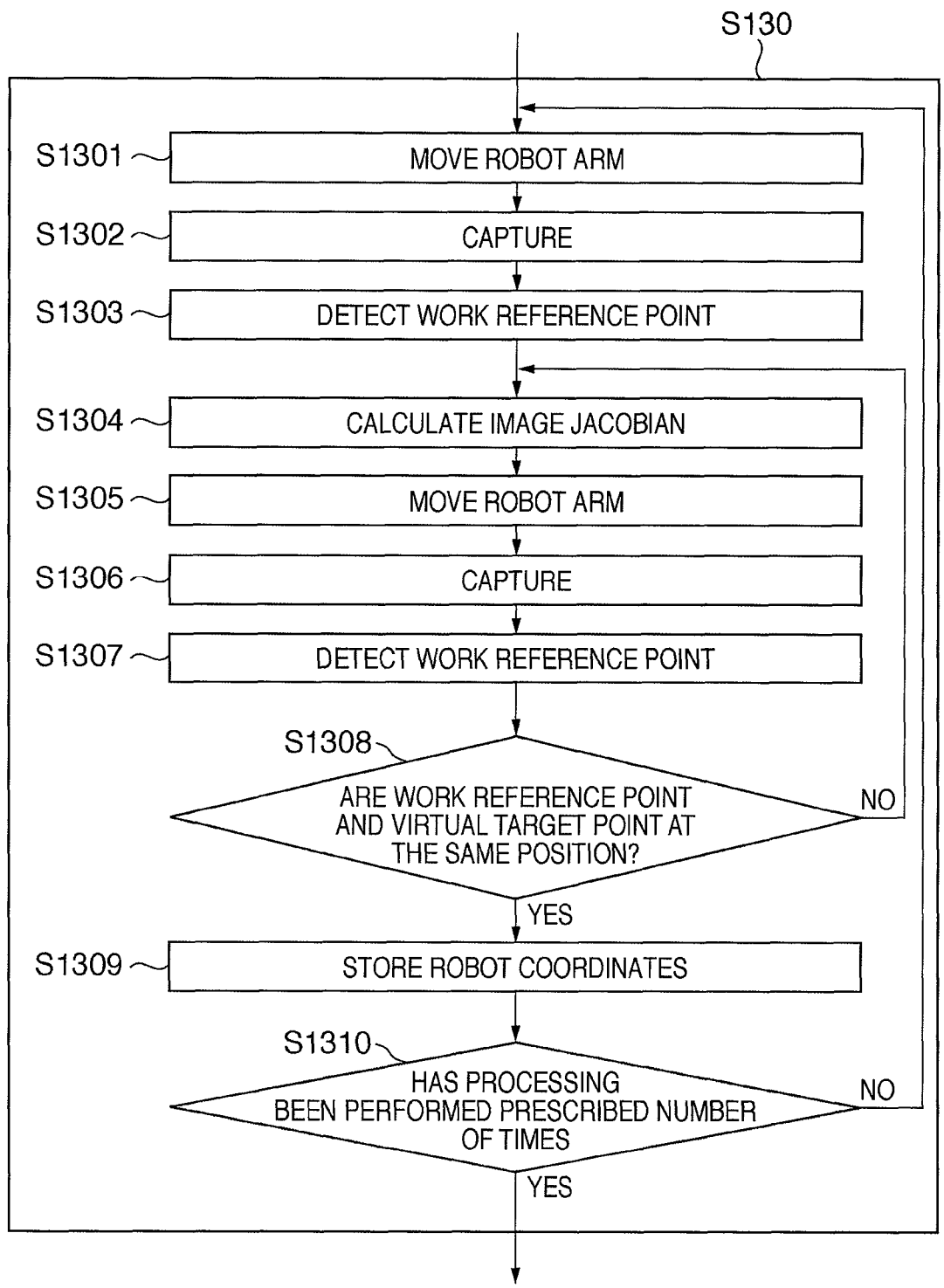

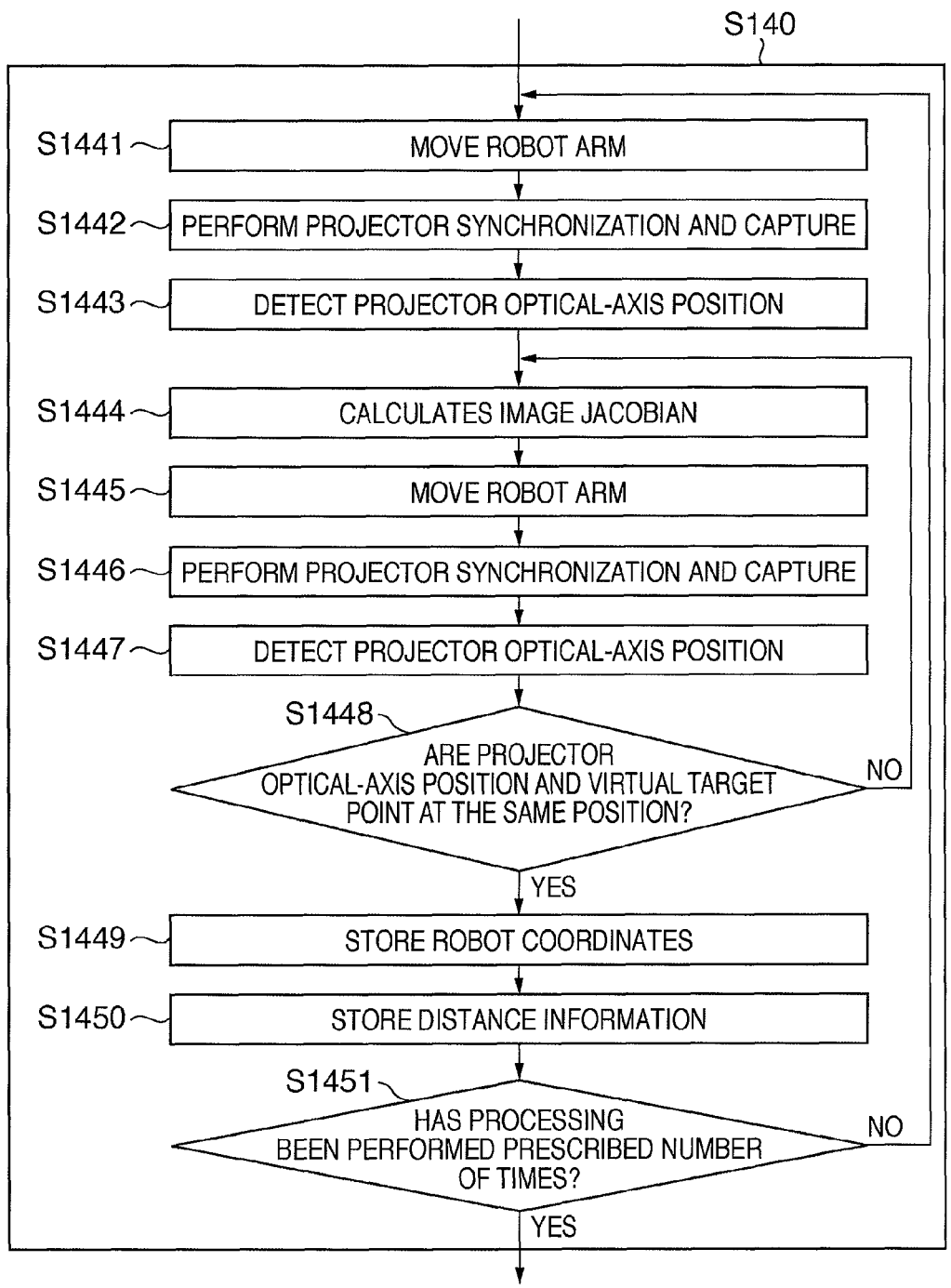

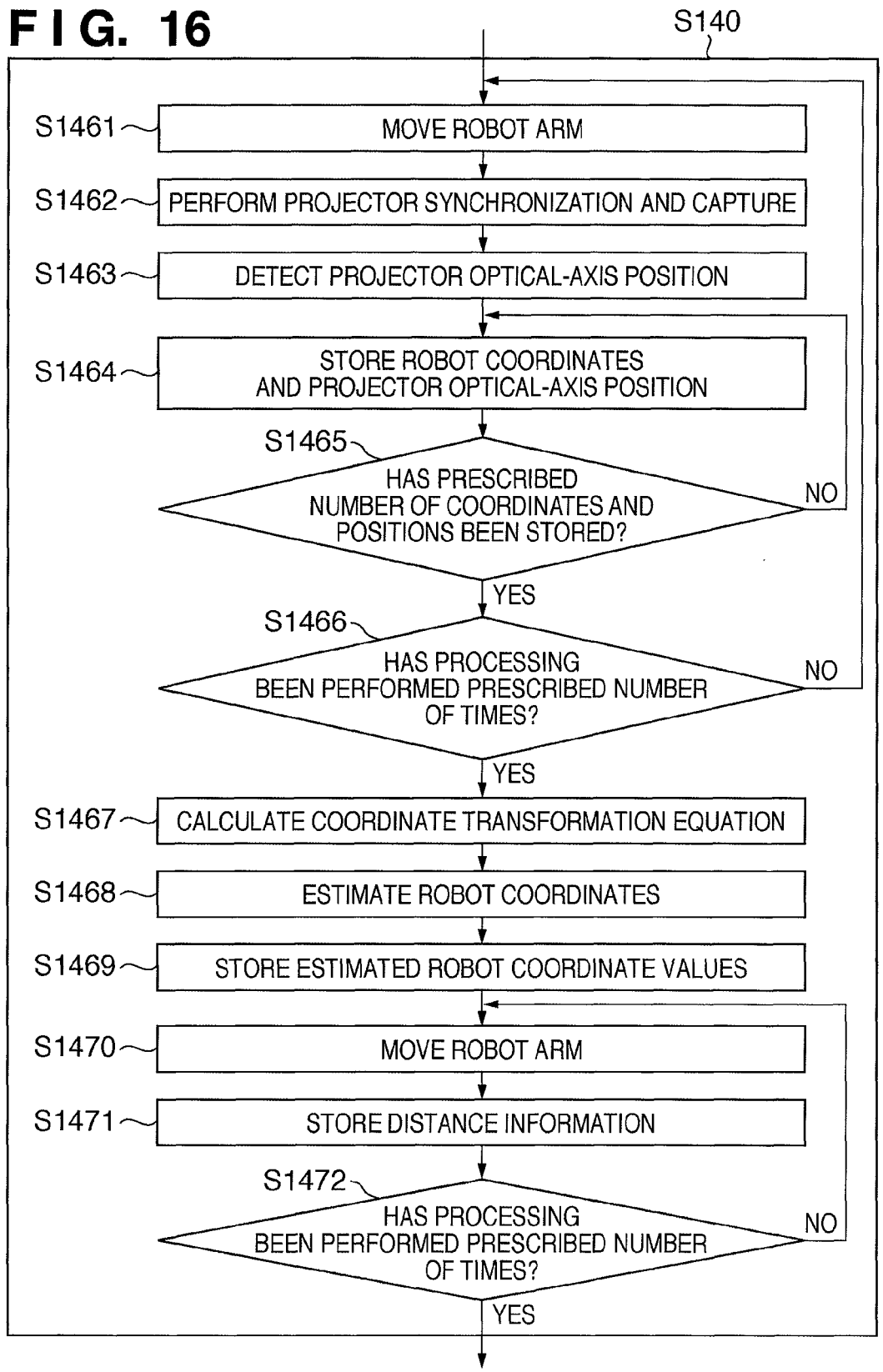

WORK APPARATUS AND CALIBRATION METHOD FOR THE SAME

BACKGROUND OF THE INVENTION

1. Field of the Invention

The present invention relates to a work apparatus such as a robot that performs work, and particularly relates to a calibration method for calibrating the optical-axis direction of a distance measurement unit that the work apparatus has, and an offset amount.

2. Description of the Related Art

In the field of industrial robots used for work such as assembly or processing, in a case in which operation is performed with respect to an object whose position is indefinite, it is necessary to measure the position of the object, which is a work target. Image information is often used for two-dimensional position detection, and for a case in which the height of the work target is also indefinite, there are various methods using three-dimensional measurement means.

In a case of causing a robot to work based on the combination of image information and distance measurement, it is necessary to know how the measurement result obtained by a distance measurement unit (distance sensor) corresponds to a robot coordinate system that the robot internally has. Then, for that purpose, it is necessary to obtain a relative placement positional relationship between the robot (work position thereof) and the distance sensor as calibration data.

Measures for addressing the above problem are proposed in the following Patent Documents 1 to 6.

Patent Document 1: Japanese Patent Laid-Open No. 11-123678
Patent Document 2: Japanese Patent Laid-Open No. 2005-271103
Patent Document 3: Japanese Patent No. 03239277
Patent Document 4: Japanese Patent Laid-Open No. 05-280927
Patent Document 5: Japanese Patent Laid-Open No. 10-103937
Patent Document 6: Japanese Patent No. 04021413

In Patent Document 1, the end of a welding torch of a welding robot is caused to touch a reference position on a workpiece in teaching, and a laser illumination position of a laser sensor for distance measurement is caused to match with the reference position in teaching, thereby obtaining the optical-axis direction of the distance sensor and an offset amount. Further, in Patent Document 2, calibration is performed by causing a robot to touch a plurality of points on a plane jig whose world coordinates are known in teaching, and establishing correspondence between the result of three-dimensional measurement and the robot coordinate system.

These Patent Documents 1 and 2 disclose methods for calibration by manually moving a robot in teaching and causing the robot to touch a reference position.

Patent Document 3 discloses that by placing the optical axis of a distance sensor so as to match the center axis of a robot hand, correspondence between the robot coordinate system and the distance sensor coordinate system is established, without calibration. This is a method for addressing the problem, through the position at which the sensor is placed.

Patent Document 4 discloses that a plate having a marker whose position is known is attached to a robot arm, laser slit light from a projector placed in a global position is emitted on the plate, an image thereof is taken with a camera, and coordinate calibration is performed. Since the world coordinate position of the marker is determined by a robot command, correspondence between the image coordinates of the laser slit and the robot coordinates are decided.

Further, in Patent Document 5, a tilted plate is rotated having a rotation axis at the same position as the design position of the distance sensor laser optical axis, and the angle of the optical axis relative to a designed value is calculated from the difference between measured values. This method requires a jig with which highly accurate operation and attachment accuracy are assured.

In Patent Document 6, the optical-axis direction of a camera mounted to an arm is obtained by moving the arm while maintaining a target in a working area so as to be in the image center using visual servoing. In this conventional example, only the optical-axis direction of the camera is obtained, and calculation for obtaining an offset amount relative to the robot hand is not referred to.

With a calibration method achieved by teaching a robot to touch as disclosed in Patent Documents 1 and 2, since physical contact of the robot is involved, there is always the risk of the robot being broken, and in a case of requiring calibration with accuracy, a worker needs to be skilled.

Further, with the apparatus configuration for causing the center axis of a robot hand and the distance sensor optical axis to match as disclosed in Patent Document 3, restrictions will be imposed when designing a holding mechanism and the like. Furthermore, since an attachment error is not allowed when the sensor is attached, high assembly accuracy is needed.

Further, in Patent Document 4, the projector of laser slit light is placed in a global position, and accordingly a measurable area is limited. Further, in order to make the marker position of the plate attached to the robot arm known in the robot coordinate system, the marker position on the plate needs to be decided with high accuracy, and the attachment accuracy of the plate is also required.

Further, although Patent Document 5 discloses a calibration method using a special jig, a jig that is created with high accuracy and operates with high accuracy is needed, and the jig also needs to be attached to an apparatus accurately. Such a jig is expensive, and furthermore, placement thereof is complicated.

SUMMARY OF THE INVENTION

The present invention has been made in light of the above problems, and an object thereof is to contactlessly and automatically obtain a calibration parameter for a work unit and a distance measurement unit that a work apparatus has.

According to one aspect of the present invention, a calibration method for a work apparatus comprising a moving unit configured to move a work unit to a work position, a distance information obtaining unit placed on the moving unit and configured to move together with the work unit, and an imaging apparatus fixed independently from the moving unit, the method comprising:

a first obtaining step of setting a virtual target point on an image plane in the imaging apparatus, and obtaining a plurality of coordinate values of the moving unit at which a work reference point of the work unit, and the virtual target point are caused to match on an image captured by the imaging apparatus;

a second obtaining step of obtaining, in the image, a plurality of coordinate values of the moving unit at which a position of light projection by the distance information obtaining unit and the virtual target point are caused to match; and a calculating step of calculating, based on the coordinate values obtained in the first obtaining step and the second obtaining step, a calibration parameter for the moving unit and the distance information obtaining unit.

Further features of the present invention will become apparent from the following description of exemplary embodiments with reference to the attached drawings.

BRIEF DESCRIPTION OF THE DRAWINGS

FIG. 6 is a flowchart showing the details of work reference point target position calculation processing in a first embodiment.

FIG. 15 is a flowchart showing the details of light projection target position calculation processing in the sixth embodiment.

FIG. 16 is a flowchart showing another procedure of light projection target position calculation processing in the sixth embodiment.

DESCRIPTION OF THE EMBODIMENTS

Hereinafter, preferred embodiments of the present invention are described with reference to the attached drawings.

First Embodiment

Figure 1:
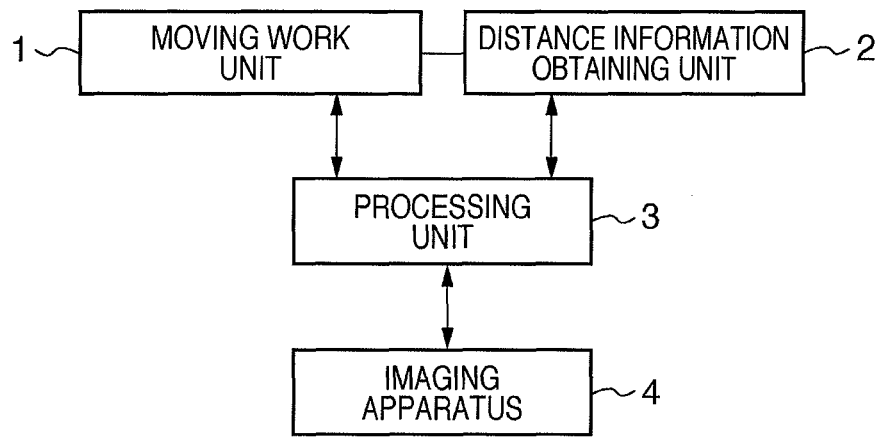
FIG. 1 is a block diagram showing the schematic configuration of a work apparatus in an embodiment of the present invention.

FIG. 1 shows a basic configuration of an apparatus suitable for implementing the present invention. In FIG. 1, a moving work unit 1 is an apparatus that has an operation mechanism for movement in order to perform work, and specifically, is realized by an industrial robot arm, an automatic stage, an end effector placed thereon, and the like. The moving work unit 1 is provided with a work unit (a robot hand or the like) that actually performs work with respect to a work target, and a moving unit (a robot arm) that moves the work unit to a work position. A distance information obtaining unit 2 is physically connected to the moving work unit 1, and its position changes in accordance with the movement of the moving work unit 1. An imaging apparatus 4 is an apparatus for capturing a working area of the moving work unit 1, and is fixed independently from the moving work unit 1. A processing unit 3 is connected to the moving work unit 1, the distance information obtaining unit 2, and the imaging apparatus 4, and is an apparatus for controlling each unit and performing desired calculation based on information obtained from each unit. Specifically, the processing unit 3 is constituted by a personal computer or a programmable controller (hereinafter, referred to as a PC), a robot controller, or the like.

Figure 2:
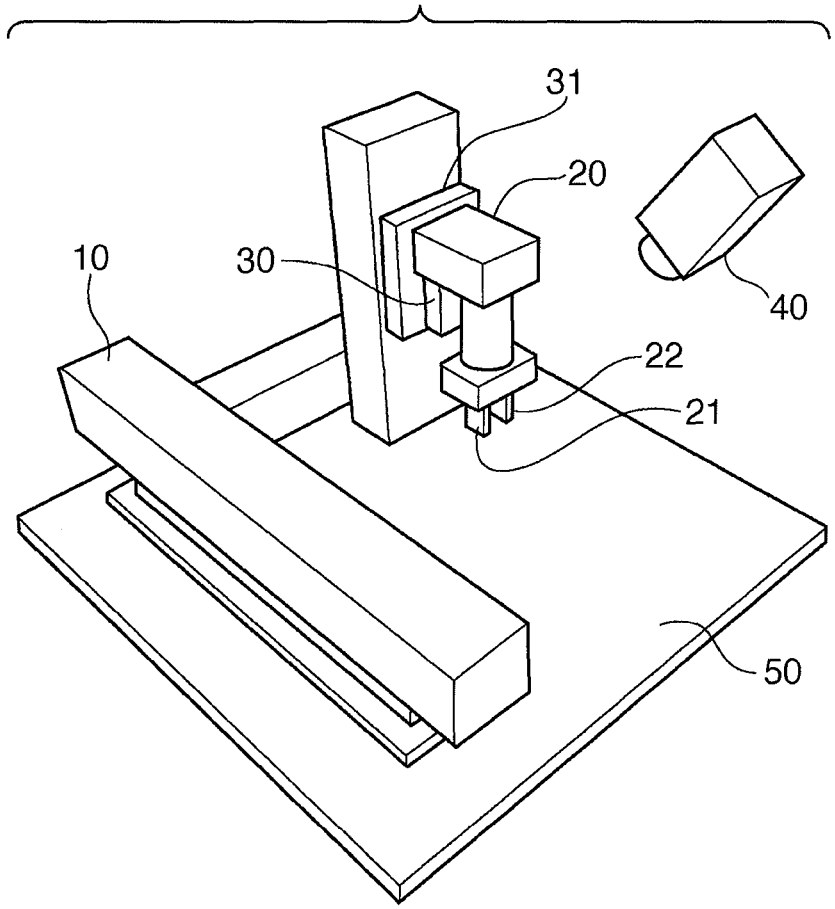
FIG. 2 is a diagram showing an example of the configuration of the work apparatus according to an embodiment of the present invention.

FIG. 2 shows a specific configuration of an apparatus suitable for implementing the present invention in a first embodiment. FIG. 2 is a diagram showing an example of a configuration of a work apparatus in the first embodiment.

A movable robot arm 10 is fixed to a working area 50. A hand base plate 31 is placed in a portion where an end effector of the robot arm 10 is attached, and a robot hand 20 is fixed to the hand base plate 31. These correspond to the moving work unit 1 shown in FIG. 1. Furthermore, a distance sensor 30 is fixed to the hand base plate 31, and when the end effector of the robot arm 10 moves, the end effector operates such that the relative positional relationship between the robot hand 20 and the distance sensor 30 does not change via the hand base plate 31. Here, the distance sensor 30 is a sensor using existing technology for illuminating an object to be measured with laser light emitted downward, and outputting a voltage value that is proportional to the distance by using a PSD or the like to detect the position of a luminescent spot obtained by the laser being diffusely reflected by the surface of the measurement target. The distance sensor 30 corresponds to the distance information obtaining unit 2 shown in FIG. 1. The distance sensor 30 is connected to a PC (not shown) via an A/D converting board or the like (not shown), and the PC can monitor a value measured by the distance sensor. Note that although the robot arm 10 shown in FIG. 2 is an XYZ type robot, the work apparatus of the present invention is not limited to this configuration, and a robot having another configuration, such as a scalar type robot or a multi-jointed robot, for example, may be used.

The robot hand 20 is provided with fingers 21 and 22 for holding an object. Although the robot hand 20 is drawn with two fingers here, a robot hand constituted from three or more fingers may be used. Further, if the operation purpose of the robot is not holding an object, a robot hand provided with a work unit having a configuration other than a finger, such as a welding torch, at the end may be used. The robot arm 10 is connected to a robot controller (not shown), and operates in accordance with an operation signal from the robot controller. The PC and the robot controller correspond to the processing unit 3 shown in FIG. 1. A camera 40 corresponding to the imaging apparatus 4 is placed in the space above the robot, and captures the working area 50. The camera 40 is connected to the PC described above, and prescribed processing is performed on images acquired from the camera 40 using a program that operates on the PC. As described above, the robot controller and the PC are connected, and a command can be transmitted to the robot arm 10 from the robot controller in accordance with instructions from the PC.

Figure 3:
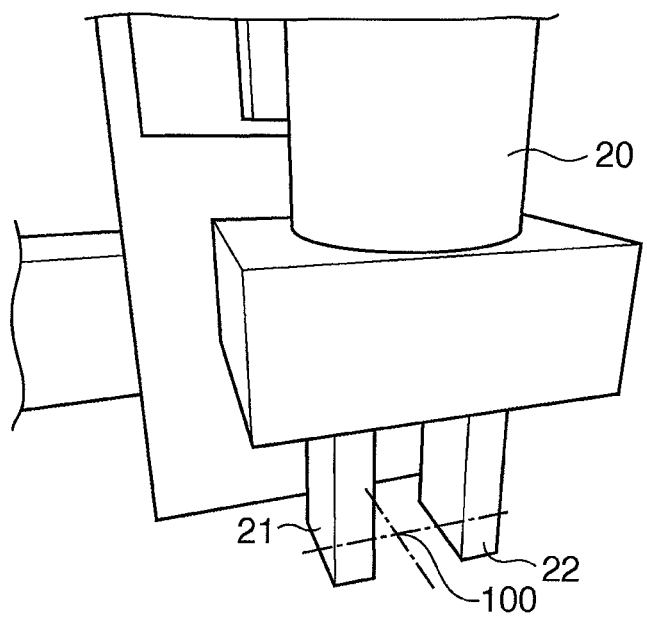
FIG. 3 is a diagram illustrating a work reference point.

FIG. 3 is a diagram illustrating an example of a work reference point of the work apparatus in the present embodiment. When performing an actual operation, such as holding of an object, the middle position between the fingers 21 and 22 of the robot hand 20 needs to be matched with a target to be held. This middle position is defined as a work reference point. In FIG. 3, the work reference point is shown by reference numeral 100. If the height of a target to be held is indefinite, a movement command for moving the work reference point 100 to a prescribed position needs to be given to the robot controller based on the distance obtained by the distance sensor 30. In order to give a movement command as robot coordinates, the relative position between the distance sensor 30 and the work reference point 100 needs to be obtained.

Figure 4:
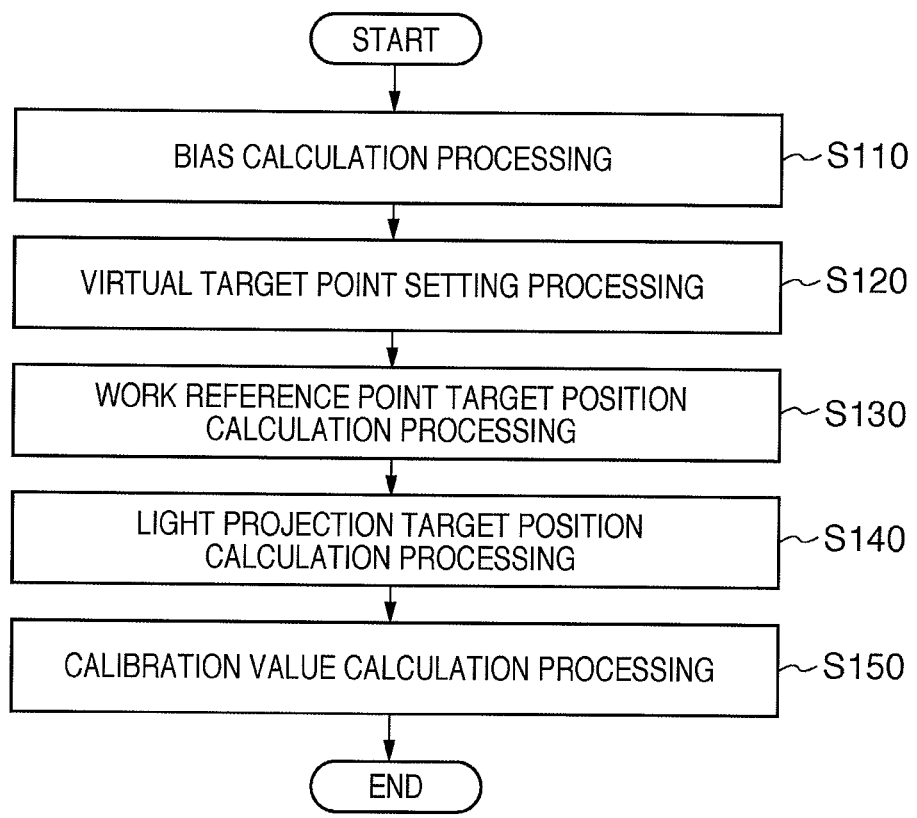
FIG. 4 is a flowchart illustrating calibration processing in an embodiment of the present invention.

Next, a description is given regarding the outline of the work for calibrating the positional relationship between the distance sensor 30 and the work reference point 100 described above, in accordance with the flowchart shown in FIG. 4.

Figure 5A:
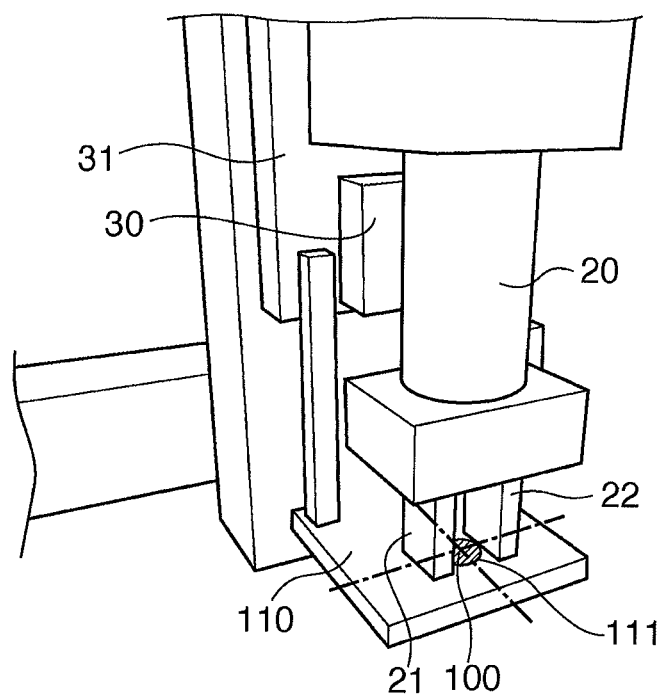
FIGS. 5A and 5B are diagrams illustrating a calibration plate in an embodiment.
Figure 5B:
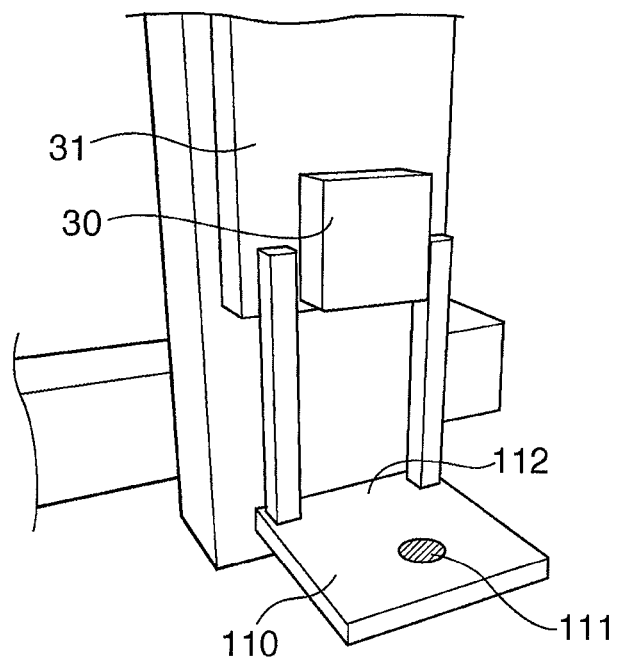

In order to start calibration work, first, a user places a calibration plate 110 on the hand base plate 31. As shown in FIG. 5A, a marker 111 whose center is in a position that matches the work reference point 100 is drawn on the calibration plate 110. Further, a work reference plane 112 is set to the calibration plate 110 in order to have illumination with the laser light emitted from the distance sensor 30 at the same height relative to the work reference point when the calibration plate 110 is placed. Note that as shown in FIG. 5B, calibration work is performed in a state in which the robot hand 20 is removed from the hand base plate 31.

In bias calculation processing (S110), the PC acquires a value measured by the distance sensor 30, in a state in which the calibration plate 110 has been placed, and stores this as a bias voltage value in a storage device of the PC.

In virtual target point setting processing (S120), the PC sets a virtual target point on the image plane of an image obtained from the camera 40, and stores this in its storage device.

In work reference point target position calculation processing (S130), the PC causes the robot arm 10 to operate such that the center position of the marker 111 of the calibration plate 110, or in other words, the work reference point 100 comes closer to the virtual target point on the image obtained from the camera 40. Then, the PC obtains a plurality of robot coordinates at which the work reference point 100 and the virtual target point match on the image, and the robot coordinate values at that time are stored in the storage device of the PC. In other words, the PC performs first obtaining processing for obtaining a plurality of coordinates (robot coordinates) of the moving unit (the moving work unit 1) at which the work reference point 100 of the work unit, and the virtual target point set in S120 are caused to match on the image captured by the camera 40.

In light projection target position calculation processing (S140), first, the user removes the calibration plate 110 from the hand base plate 31. The PC causes the distance sensor 30 to emit a laser in the state in which the calibration plate 110 is removed, and captures, with the camera 40, the diffuse reflection of the laser with which the working area 50 is illuminated, and detects the light projection position of the laser on the image. Then, the PC causes the robot arm 10 to operate such that the detected light projection position comes closer to the virtual target point on the image. The PC obtains a plurality of robot coordinates at which the light projection position and the virtual target point match on the image, and stores these in its storage device, together with the voltage value output by the distance sensor 30 at each of the coordinates. In other words, the PC performs second obtaining processing for obtaining, on the image plane, a plurality of coordinates (robot coordinates) of the moving unit (the moving work unit 1) at which the light projection position of the distance sensor 30 and the virtual target point are caused to match, and a plurality of pieces of distance information from the distance sensor 30 at those positions.

In calibration value calculation processing (S150), the PC calculates the relative positional relationship between the distance sensor 30 and the work reference point 100 as a calibration value based on the following that are obtained through the previous processes, and stores the result in its storage device:
  a bias voltage value
  a robot coordinate value when the virtual target point and the marker match
  a robot coordinate value when the virtual target point and the laser illumination position match and a voltage value output by the distance sensor 30

This completes the description regarding the outline of the calibration work in the present embodiment. The following is a detailed description regarding the calibration work.

In bias calculation processing (S110), the PC causes the distance sensor 30 to emit a laser in a state in which the calibration plate 110 is attached, and measures the distance. The PC stores the output voltage obtained at this time in the storage device as a bias voltage $V_B$. Further, in virtual target point setting processing (S120), the PC defines a virtual target point at an arbitrary image coordinate position in the image obtained from the camera 40, and stores this as coordinates $x_S$ in the storage device.

Next, work reference point target position calculation processing (S130) is described in detail with reference to the flowchart shown in FIG. 6. FIG. 6 is a flowchart showing the details of work reference point target position calculation processing in the present embodiment.

First, the PC fixes a Z coordinate value of a robot coordinate system to $Z_1$, causes the robot arm 10 to move to the position of arbitrary coordinates (a value of X and Y coordinates) in the robot coordinate system (S1301), and performs capture with the camera 40 (S1302). The PC calculates the center position of the marker 111 on the calibration plate from the obtained image, and sets this as the detected position of the work reference point 100 (S1303). Based on the captured result, the PC causes the robot arm 10 to move such that the work reference point 100 (the center of the marker 111) on the calibration plate 110 matches the virtual target point $x_S$. For movement in order to cause the work reference point 100 to match the virtual target point $x_S$, for example, it is possible to use feature based visual servoing or the like, which is an existing technology. For example, the PC calculates an image Jacobian (S1304) by calculating a movement vector of the work reference point 100 in an image coordinate system of an image captured by the camera 40, with respect to a movement vector of the robot arm 10 in the robot coordinate system in the previous frame. Then, from a difference vector between the virtual target point $x_S$ and the work reference point 100 on the image, and the obtained image Jacobian, the PC causes the robot arm 10 to move in the direction in which the difference vector is smaller (S1305).

The PC performs capture with the camera 40 again (S1306), and detects the work reference point 100 on the image (S1307). If the Euclidean distance between the virtual target point $x_S$ and the work reference point 100 on the image is greater than a threshold value $\epsilon_M$ (for example, $\epsilon_M=0.5$ [pixels]), the PC returns the processing to S1304 again, and causes the robot arm 10 to move using visual servoing. On the other hand, if the Euclidean distance is smaller than the threshold value $\epsilon_M$, the PC determines that the virtual target point $x_S$ and the work reference point 100 have matched on the image (S1308), and stores the robot coordinates at that time as $X_{H1}$ in the storage device (S1309).

Next, the PC fixes the Z coordinate value of the robot coordinate system to $Z_2$, and causes the robot to move by performing similar processing to the above processing, such that the work reference point 100 matches the virtual target point $x_S$ (S1301 to S1308). Then, the PC stores the Z coordinate value as $Z_2$, and the obtained robot coordinates as $X_{H2}$ in the storage device (S1309). After processing has been performed, as described above, a prescribed number of times (twice in this example) with a different Z coordinate value, work reference point target position calculation processing (S130) ends (S1310).

Figure 7:
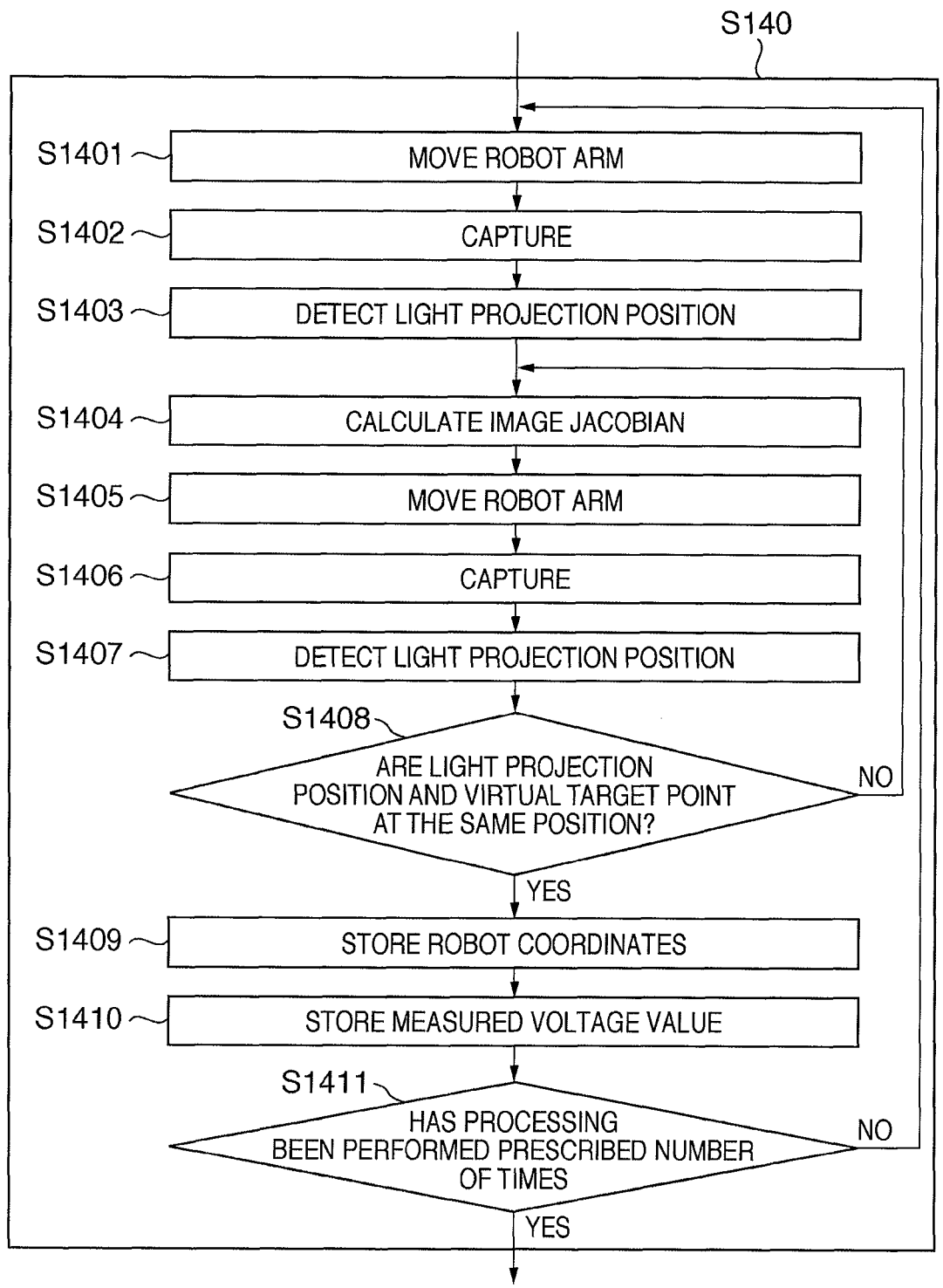
FIG. 7 is a flowchart showing the details of light projection target position calculation processing in the first embodiment.

Next, details regarding light projection target position calculation processing (S140) are described with reference to the flowchart shown in FIG. 7. FIG. 7 is a flowchart illustrating light projection target position calculation processing in the first embodiment.

First, the calibration plate 110 is removed from the hand base plate 31. Similar to work reference point target position calculation processing (S130), the PC fixes the Z coordinate value of the robot coordinate system to $Z_1$, and causes the robot arm 10 to move to the position of arbitrary coordinates (a value of X and Y coordinates) in the robot coordinate system (S1401). Then, in the state in which the calibration plate is removed, the PC executes illumination with the laser by the distance sensor 30, and capture with the camera 40 (S1402), and detects the light projection position where the floor surface of the working area 50 is illuminated with the laser (S1403).

Next, the PC causes the robot arm 10 to move such that the detected light projection position is projected on the virtual target point $x_S$. A method for moving the robot arm 10 in order to cause the light projection position and the virtual target point $x_S$ to match is similar to that in work reference point target position calculation processing (S130), and for example, feature based visual servoing or the like can be used. An image Jacobian is calculated by calculating a movement vector of the light projection position in the image coordinate system with respect to a movement vector of the robot arm 10 in the robot coordinate system in the previous frame (S1404). From a difference vector between the virtual target point $x_S$ and the light projection position on the image, and the obtained image Jacobian, the robot arm 10 is moved in the direction in which the difference vector is smaller (S1405). The PC captures laser illumination by the distance sensor 30 with the camera 40 again (S1406), and detects the light projection position of the laser (S1407). If the Euclidean distance on the image between the virtual target point $x_S$ and the light projection position is greater than a threshold value $\epsilon_L$ (for example, $\epsilon_L$=0.5 [pixels]), the PC returns the processing to S1404, and causes the robot arm 10 to move using visual servoing. On the other hand, if the Euclidean distance is smaller than the threshold value $\epsilon_L$, the PC determines that the virtual target point $x_S$ and the light projection position have matched on the image (S1408). Then, the PC stores the robot coordinates when the light projection position and virtual target point $x_S$ match as $X_{L1}$ in the storage device (S1409), and stores a voltage value $V_1$ measured by the distance sensor 30 at the robot coordinates in the storage device (S1410).

Next, the PC executes the above processing in a state in which the Z coordinate value of the robot coordinate system is fixed to $Z_2$, and stores the robot coordinates and the measured voltage value that were obtained as $X_{L2}$ and $V_2$, respectively, in the storage device (S1401 to S1410). After processing has been performed, as described above, a prescribed number of times (twice in this example) with a different Z coordinate value, light projection target position calculation processing (S140) ends (S1411).

Finally, in calibration value calculation processing (S150), a calibration value is calculated based on the values obtained in processes. A method for calculating a calibration value is described in detail with reference to FIGS. 8 and 9.

Assuming that the optical path difference in the robot coordinate system is $\Delta l$ [mm], with respect to displacement $\Delta V$ [V] in the output voltage from the distance sensor 30, $\Delta V$ and $\Delta l$ have a relationship therebetween shown by the following Equation 1.

$$\Delta l = \eta \Delta V \quad \text{[Equation 1]}$$

However, $\eta$ is an unknown constant.

Figure 8:
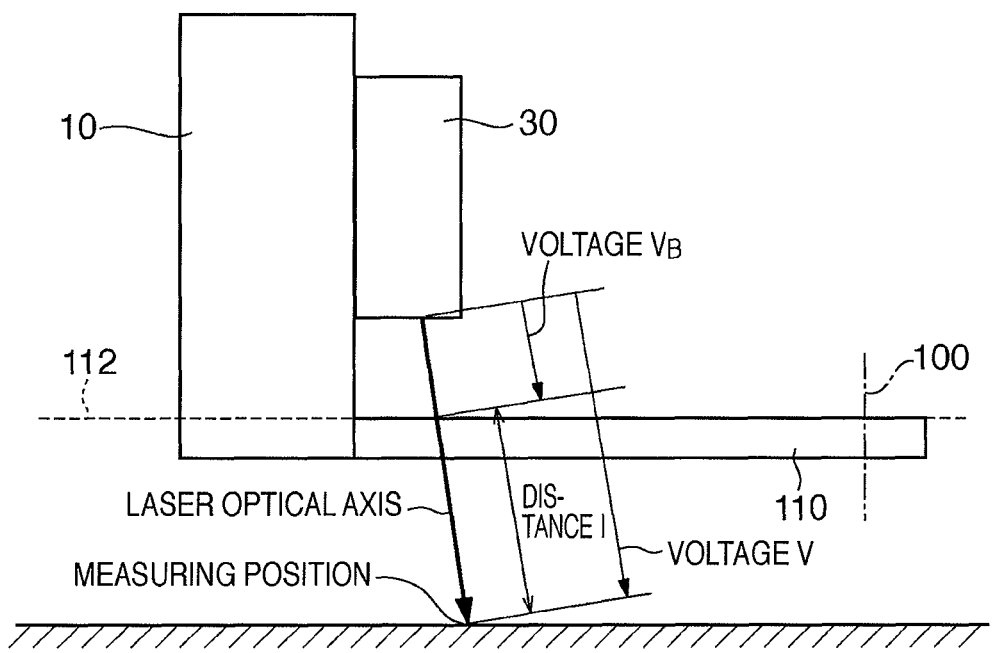
FIG. 8 is a diagram illustrating a work reference plane and a bias.

Assuming that the work reference plane 112 is parallel to an X-Y plane that passes through the Z coordinate of the work reference point 100, the voltage $V_B$ when a relative distance between this work reference plane 112 and the distance sensor 30 is measured is considered to be a bias. Then, when the measured voltage when the robot arm 10 is at an arbitrary position is V, as shown in FIG. 8, a distance 1 from the work reference plane 112 to the light projection position can be obtained using the following Equation 2.

$$l = \eta(V - V_B) \quad \text{[Equation 2]}$$

Here, calibration parameters necessary for making the light projection position and the work reference point match when the value 1 is obtained are:
an offset amount W between the work reference point and an intersection point of the work reference plane 112 and a laser optical axis, in the robot coordinate system; and
a normalization direction vector L of the laser optical axis, which is a unit vector that expresses the direction of laser illumination by the distance sensor 30, in the robot coordinate system as well.

Figure 9:
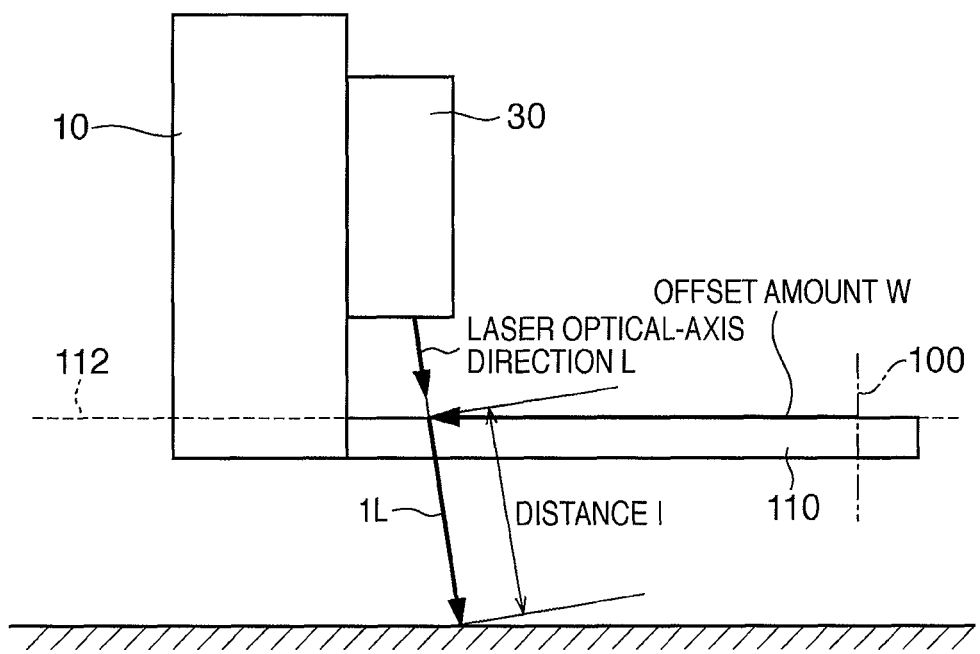
FIG. 9 is a diagram illustrating a calibration value in an embodiment.

In other words, if the measured distance obtained at the time of robot coordinates X is l, the relative movement vector for moving the work reference point to this light projection position $X_L$ is expressed by Equation 3, as shown in FIG. 9.

$$W + lL \quad \text{[Equation 3]}$$

Therefore, a command $X_L$ to be given to the robot in order to cause the work reference point 100 to match the light projection position is calculated as shown by the following Equation 4.

$$X_L = X + W + lL \quad \text{[Equation 4]}$$

Figure 10:
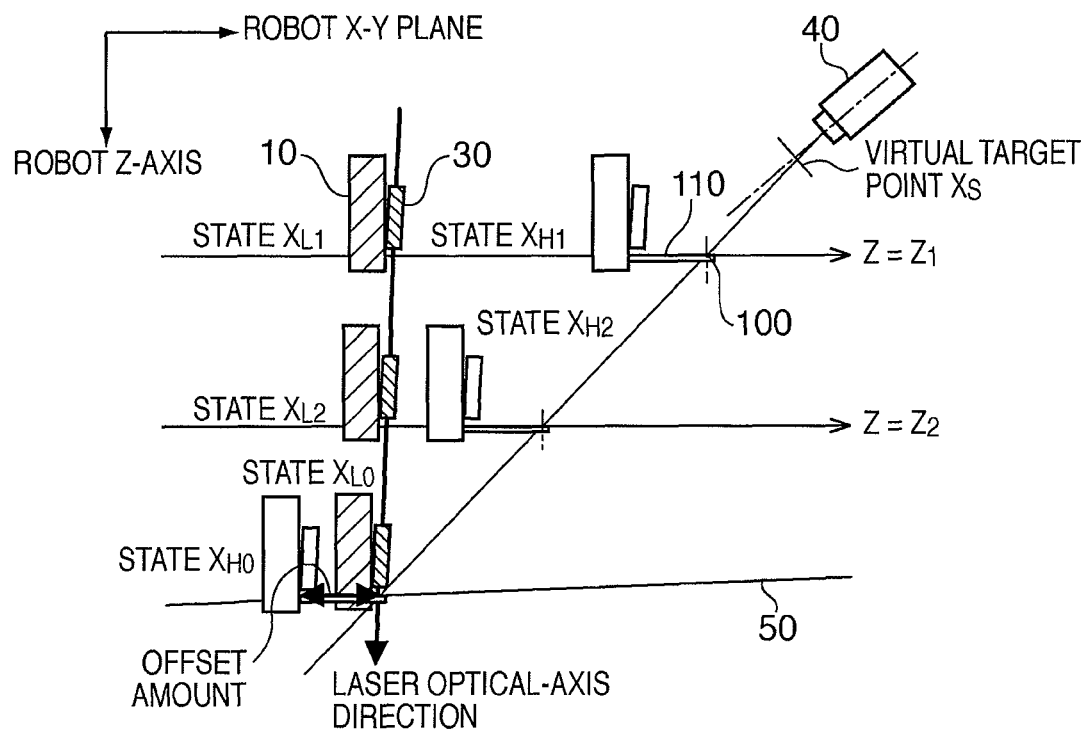
FIG. 10 is a diagram showing the principle of calibration in an embodiment.

Accordingly, if the bias voltage $V_B$, the proportionality constant the sensor offset amount W, and the laser-optical-axis normalization direction vector L are obtained as calibration parameters, correspondence between the light projection position and the robot coordinates can be established from the displacement sensor measured value. A method for calculating these calibration values to be obtained is described with reference to FIG. 10.

The length of a movement path when the robot coordinate position is displaced from $X_{L1}$ to $X_{L2}$ is $\|X_{L1} - X_{L2}\|$. Since the difference vector between $X_{L1}$ and $X_{L2}$ matches the direction of the laser optical axis, the length of the movement path $\|X_{L1} - X_{L2}\|$ is equal to the difference between the length of laser light paths at the positions $X_{L1}$ and $X_{L2}$. Since the positive/negative direction of the optical path length is opposite to the robot Z-axis, the proportionality constant n for converting the voltage value from the distance sensor 30 into the distance in a robot coordinate system scale is obtained as follows.

$$\eta = \frac{\|X_{L1} - X_{L2}\|}{V_1 - V_2} \quad \text{[Equation 5]}$$

Further, the normalization vector indicating the direction of a laser optical axis is obtained as follows.

$$L = \frac{X_{L2} - X_{L1}}{\|X_{L2} - X_{L1}\|} \quad \text{[Equation 6]}$$

Here, assume that $X_{L0}$ is a virtual position at which the robot arm 10 was lowered with the light projection position on the image maintained at the virtual target point $x_S$, so as to cause the work reference plane 112 to match the floor surface. This virtual position $X_{L0}$ is estimated as follows, from the result of measurement by the distance sensor 30, and the parameters $V_B$, $\eta$, and L that have been hitherto obtained.

$$X_{L0}=X_{L2}+\eta(V_2-V_B)L \qquad \text{[Equation 7]}$$

Next, assume that $X_{H0}$ is a virtual position at which the robot arm 10 was lowered with the work reference point 100 on the image maintained at the virtual target point $x_S$, so as to cause the work reference plane 112 to match the floor surface. A difference vector between the robot coordinates $X_{H1}$ and $X_{H2}$ that are obtained in advance is a direction vector of a straight line along which the robot arm 10 can be moved with the work reference point 100 maintained at the virtual target point $x_S$. Assuming this as H, H can be obtained as follows.

$$H = \frac{X_{H2}-X_{H1}}{\|X_{H2}-X_{H1}\|} \qquad \text{[Equation 8]}$$

Assuming that the amount of movement from the state $X_{H2}$ to $X_{H0}$ is $l_{H2\text{-}H0}$, $X_{H0}$ is expressed as follows.

$$X_{H0}=X_{H2}+l_{H2\to H0}H \qquad \text{[Equation 9]}$$

Here, since the ratio of $l_{H2\text{-}H0}$ to the amount of movement from $X_{H2}$ to $X_{H1}$ is equal to the ratio of the amount of movement from $X_{L2}$ to $X_{L0}$ to the amount of movement from $X_{L1}$ to $X_{L2}$, $l_{H2\text{-}H0}$ is obtained as follows.

$$l_{H2\to H0} = \frac{\|X_{L0}-X_{L2}\|}{\|X_{L2}-X_{L1}\|}\|X_{H2}-X_{H1}\| \qquad \text{[Equation 10]}$$

Therefore, $X_{H0}$ is calculated as follows.

$$X_{H0} = \frac{\|X_{L0}-X_{L1}\|}{\|X_{L2}-X_{L1}\|}X_{H2} - \frac{\|X_{L0}-X_{L2}\|}{\|X_{L2}-X_{L1}\|}X_{H1} \qquad \text{[Equation 11]}$$

Since the offset amount W is equal to the relative positional relationship between $X_{H0}$ and $X_{L0}$, W is obtained as follows.

$$W=X_{H0}-X_{L0} \qquad \text{[Equation 12A]}$$

The PC stores the bias voltage $V_B$, the proportionality constant $\eta$, the sensor offset amount W, and the laser-optical-axis normalization direction vector L that are obtained as described above in the storage device, and ends calibration work. Note that actual operations by the robot work apparatus using these obtained calibration values are performed as follows, for example. Assume that in the image coordinate system, a work target is put in an approximate existing position, a command to move to robot coordinates $X_a$ is transmitted to the robot in order to measure that detailed position of the target, and a measured voltage from the distance sensor at the robot coordinates $X_a$ is $V_a$. At this time, an optical path length $l_a$ of the distance sensor can be obtained as follows from the calibration values $\eta$ and $V_B$ and the measured voltage value $V_a$ using Equation 2.

$$l_a=\eta(V_a-V_B) \qquad \text{[Equation 12B]}$$

Further, the work reference position of the robot is moved to a measuring position as follows. Specifically, it is sufficient to give the robot a command to move to robot coordinates $X_{aL}$, obtained as follows using Equation 4, from the robot coordinates $X_a$ at the time of measurement, and the distance sensor optical path length $l_a$ and the calibration values W and L that have been obtained using the above equations.

$$X_{aL}=X_a+W+l_aL \qquad \text{[Equation 12C]}$$

Second Embodiment

In the first embodiment, in light projection target position calculation processing (S140), using visual servoing, robot coordinates were obtained at which the virtual target point and the light projection position of the distance sensor 30 match on a captured image. However, light projection target position calculation processing is not limited to such a method. In a second embodiment, as an example thereof, in light projection target position calculation processing (S140), $X_{L1}$ and $X_{L2}$ are obtained as follows so as to perform calibration. Note that in a robot system having a similar configuration to that in the first embodiment, the working area 50 that is illuminated with a laser by the distance sensor 30 is assumed to have flatness at a prescribed level. Here, examples of flatness at a prescribed level include levels such as flatness intersection 0.1 [mm], with respect to the working area 50, which is 500 [mm]×500 [mm].

In light projection target position calculation processing (S140) in the second embodiment, in a state in which the calibration plate 110 is removed, the PC causes the robot arm 10 to move to three or more positions in the same plane in the robot coordinate system. Then, the PC detects, at respective positions, the light projection position at which the working area 50 is illuminated by the distance sensor 30, and stores corresponding robot coordinate values and light projection positions in the storage device. Furthermore, the PC also detects light projection positions in a similar way, regarding three or more positions in the same plane, which is different from the plane including the above three positions, in the robot coordinate system, and stores robot coordinate values and light projection positions in the storage device. From respective coordinate transformation matrices obtained in this way in two planes, the PC estimates values of robot coordinates at which the light projection position and the virtual target point match in both planes. Then, the PC causes the robot arm 10 to move to the estimated robot coordinates, performs measurement using the distance sensor 30, and stores those estimated robot coordinates and the sensor measured values in the storage device.

In other words, the PC obtains a plurality of pairs of coordinates of the position of light projection by the distance sensor 30 in the captured image and coordinates of the moving work unit 1 (robot coordinates) at that time, in the same Z coordinate. Then, based on the obtained plurality of pairs of coordinates, the PC estimates coordinates of the moving work unit 1 at which the light projection position matches the virtual target point on the image in that Z coordinate. Furthermore, the PC causes the moving work unit 1 to move to the estimated coordinates, and obtains distance information using the distance sensor 30. This processing is performed for a plurality of Z coordinates (in this example, two), and the obtained plurality of estimated coordinates and the obtained plurality of pieces of distance information are the output of light projection target position calculation processing (S140).

Figure 11:
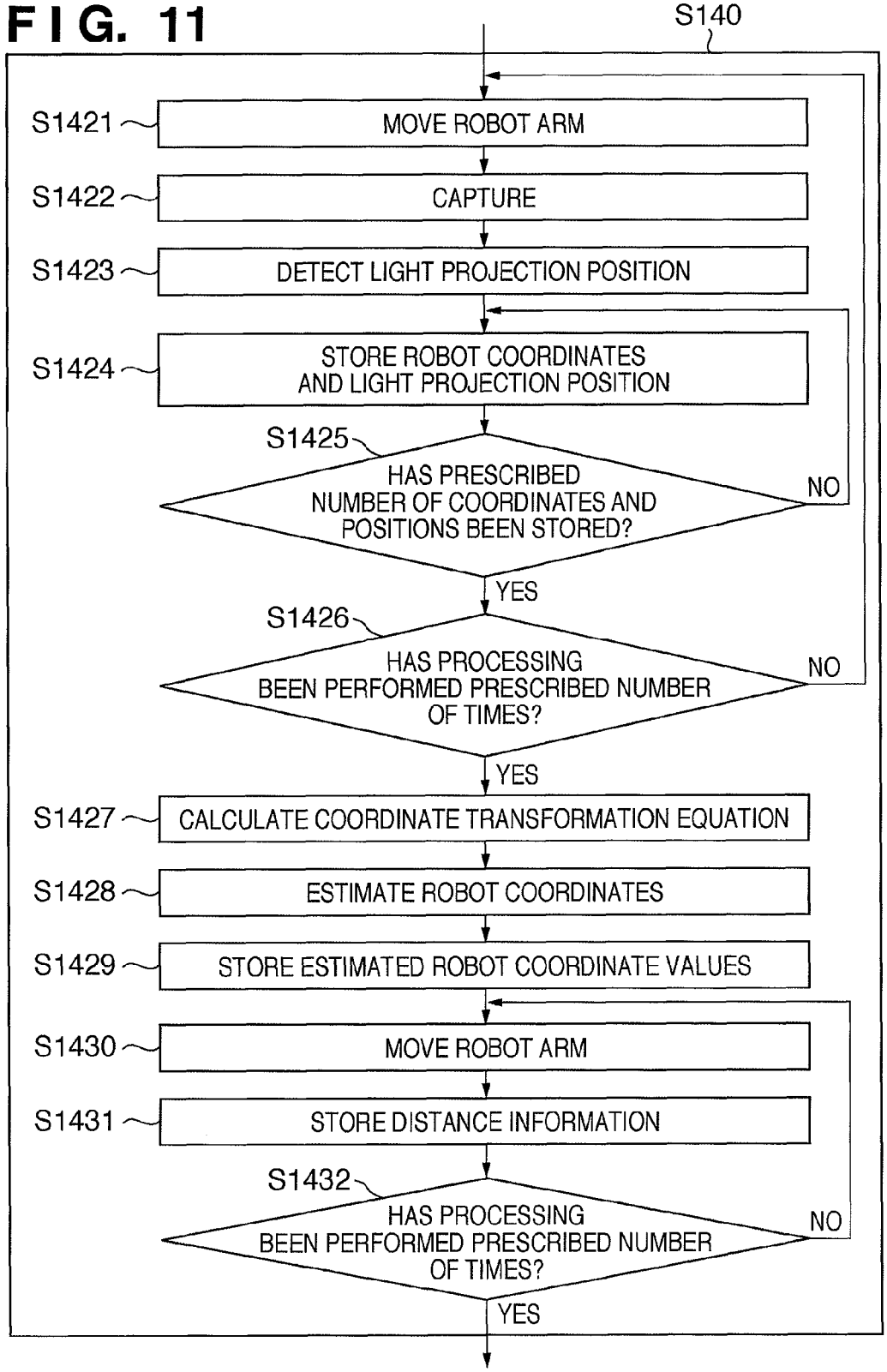
FIG. 11 is a flowchart showing the details of light projection target position calculation processing in a second embodiment and a third embodiment.

In the following, light projection target position calculation processing (S140) in the second embodiment is described in detail with reference to the flowchart shown in FIG. 11.

First, the PC causes the robot arm 10 to move, in a state in which the calibration plate 110 is removed, to an arbitrary robot coordinate position at which the diffuse reflection of the laser projected from the distance sensor 30 to the working area 50 is projected on an image (S1421). Here, assume that the robot coordinate position is $X_{1,1}=[X_{1,1}, Y_{1,1}, Z_1]^T$. Then, the PC captures an image of illumination with a laser from the distance sensor 30 with the camera 40 (S1422), and detects the light projection position of the laser on the image (S1423). At this time, the PC sets the image coordinate value of the light projection position of the laser detected on the image to $x_{1,1}$, and stores $X_{1,1}$ and $x_{1,1}$ in the storage device (S1424).

In a similar way, without changing the Z coordinate of the robot, the robot arm 10 is sequentially moved to $X_{1,2}=[X_{1,2}, Y_{1,2}, Z_{1,2}]^T$ through $X_{1,N1}=[X_{1,N1}, Y_{1,N1}, Z_{1,N1}]^T$. Then, the PC detects image coordinate values $x_{1,2}$ to $x_{1,N1}$ of the light projection positions on the image at respective positions, and stores $X_{1,2}$ to $X_{1,N1}$, and $x_{1,2}$ to $x_{1,N1}$ in the storage device (S1421 to S1425). Here, each is set to be a state coordinates group $P_1=\{X_{1,i}|i=1 \ldots N_1\}$ and a light projection position coordinates group $S_1=\{x_{1,i}|i=1 \ldots N_1\}$. Note that $N_1$ is the number of positions to which the robot is moved when the robot Z coordinate is fixed to $Z_1$, and is set using an arbitrary integer of $N_1 \geq 3$. However, among the position vector groups of the robot coordinates set from $X_{1,1}$ to $X_{1,N1}$, three or more need to be linear independent. For example, when the number is set to be $N_1=3$, settings may be set such as $X_{1,1}=[100, 100, 100]^T$, $X_{1,2}=[100, 200, 100]^T$, and $X_{1,3}=[300, 100, 100]^T$.

Similarly, the PC fixes the robot Z coordinate to $Z_2$, and obtains $N_2$ robot coordinates $X_{2,1}$ to $X_{2,N2}$ and light projection positions $x_{2,1}$ to $x_{2,N2}$ corresponding thereto. Then, the PC stores them as a state coordinate group $P_2=\{X_{2,i}|i=1 \ldots N_2\}$ and a light projection position coordinate group $S_2=\{x_{2,i}|i=1 \ldots N_2\}$ in the storage device (S1421 to S1426).

If the flatness of the working area 50 has been obtained, the light projection positions of the laser projected from the distance sensor 30 may be considered to be orthographic projections on the working area 50 at corresponding robot coordinates. At this time, the parallelism between the working area 50 and the axis in the robot coordinate system is not given any consideration. Here, consider the image detection position of the light projection position $S_l=\{x_{l,i}|i=1 \ldots N_l\}$ with respect to the robot coordinate group $P_l=\{X_{l,i}|i=1 \ldots N_l\}$ having the equal height $Z_l$. At this time, transformation $X_{l,i} \rightarrow x_{l,i}$ including perspective projection for projecting the light projection position on the image face is linear transformation with the value of $Z_l$ fixed, in a homogeneous coordinate system. The inverse transformation thereof $x_{l,i} \rightarrow X_{l,i}$ is also expressed with linear transformation, and is expressed as follows.

$$\begin{bmatrix} X_{l,i} \\ Y_{l,i} \\ 1 \end{bmatrix} = A_l \begin{bmatrix} x_{l,i} \\ y_{l,i} \\ 1 \end{bmatrix} \quad \text{[Equation 13]}$$

Assuming that in homogeneous-coordinates expression, $X_{l,i}=[X_{l,i}, Y_{l,i}, Z_l, 1]$, and $x_{l,i}=[x_{l,i}, y_{l,i}, 1]$. Here, a transformation matrix $A_l$ is expressed as follows.

$$A_l = \begin{bmatrix} a_{Xl} & b_{Xl} & c_{Xl} \\ a_{Yl} & b_{Yl} & c_{Yl} \\ 0 & 0 & 1 \end{bmatrix} \quad \text{[Equation 14]}$$

If Equation 13 is transformed regarding and $Y_{l,i}$, it is possible to be expressed as follows.

$$\begin{cases} X_{l,i} = a_{Xl}x_{l,i} + b_{Xl}y_{l,i} + c_{Xl} \\ Y_{l,i} = a_{Yl}x_{l,i} + b_{Yl}y_{l,i} + c_{Yl} \end{cases} \quad \text{[Equation 15]}$$

When the above observed value sets $P_l$ and $S_l$ are obtained, error sums of squares $E_{Xl}$ and $E_{Yl}$ regarding $X_{l,i}$ and $Y_{l,i}$, respectively, are defined as follows.

$$\begin{cases} E_{Xl} = \frac{1}{2}\sum_{i=1}^{Nl} (a_{Xl}x_{l,i} + b_{Xl}y_{l,i} + c_{Xl} - X_{l,i})^2 \\ E_{Yl} = \frac{1}{2}\sum_{i=1}^{Nl} (a_{Yl}x_{l,i} + b_{Yl}y_{l,i} + c_{Yl} - Y_{l,i})^2 \end{cases} \quad \text{[Equation 16]}$$

If this is solved with the least-square method, the linear transformation matrix $A_l$ can be obtained. From transformation matrices $A_1$ and $A_2$ calculated from the respective observed value sets $P_1$, $S_1$ and $P_2$, $S_2$ in this way, a coordinate transformation equation for the light projection position and robot coordinates is obtained as follows (S1427).

$$\begin{cases} [X \ Y \ 1]^T = A_1[x \ y \ 1]^T (Z=Z_1) \\ [X \ Y \ 1]^T = A_2[x \ y \ 1]^T (Z=Z_2) \end{cases} \quad \text{[Equation 17]}$$

If the image coordinate value $x_S$ of the virtual target point is substituted in the respective right-hand sides of this Equation 17, it is possible to obtain estimated values of the robot coordinates $X_{L1}$ and $X_{L2}$ at which the light projection position matches the virtual target point on the image when the robot Z coordinate is set to $Z_1$ and $Z_2$ (S1428). The PC stores the robot coordinates $X_{L1}$ and $X_{L2}$ obtained in this way in the storage device (S1429). Then, the PC gives $X_{L1}$ that is the estimated value of the robot coordinates thereby obtained to the robot arm 10 as a movement command (S1430), and stores a voltage value measured by the distance sensor 30 as $V_1$ in the storage device (S1431). Similarly, the PC causes the robot arm to move to the coordinates $X_{L2}$, and stores a voltage value measured by the distance sensor 30 at that time as $V_2$ in the storage device (S1430 to S1431). In this way, after processing has been repeated only the prescribed number of times (twice in this example), light projection target position calculation processing (S140) ends (S1432).

By performing the above processing, it is possible to obtain two robot positions at which the virtual target point and the light projection position match on the image, and similar to the first embodiment, a calibration value can be calculated in calibration value calculation processing (S150).

Third Embodiment

Figure 13:
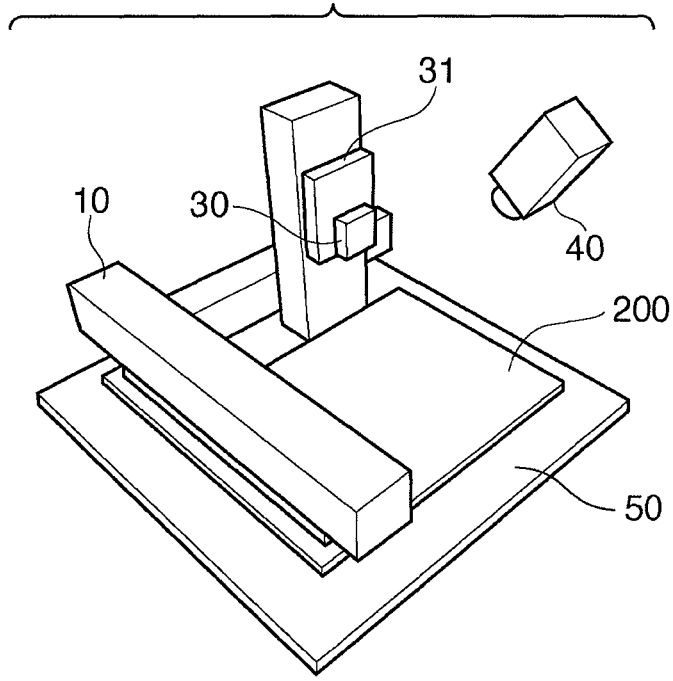
FIG. 13 is a diagram illustrating calibration using a light projection plate in the third embodiment.

In the second embodiment, in the robot system having a similar configuration to that in the first embodiment as shown in FIG. 2, it is assumed that the working area 50 has a flatness that is a prescribed level or greater. However, even in a case in which the working area 50 has unevenness and the like and does not have flatness, by putting a light projection plate 200 having flatness on the working area 50 as shown in FIG. 13, it is possible to execute light projection target position calculation processing (S140) without using visual servoing. In a third embodiment, a configuration is described in which $X_{L1}$ and $X_{L2}$ are obtained through light projection target position calculation processing (S140) using the light projection plate 200, and calibration is performed. Here, the placement angle of the light projection plate 200 is arbitrary, and the parallelism relative to the axis of robot coordinates is not given any consideration.

In light projection target position calculation processing (S140) in the third embodiment, in a state in which the calibration plate 110 is removed, the PC causes the robot arm 10 to move to three or more positions in the same plane in the robot coordinate system. Then, the PC detects the light projection position at which the light projection plate 200 is illuminated from the distance sensor 30 at respective positions on an image captured with the camera 40, and stores corresponding robot coordinate values and the light projection positions on the captured image in the storage device. The PC also detects light projection positions in a similar way, in three or more positions in the same plane, which is different from the above plane, in the robot coordinate system, and stores robot coordinate values and light projection positions in the storage device. Then, from respective coordinate transformation matrices obtained in two planes, the PC estimates values of robot coordinates at which the light projection position and the virtual target point match in both planes. The PC causes the robot arm 10 to move to those estimated robot coordinates, performs measurement using the distance sensor 30, and stores those robot coordinates and the sensor measured values in the storage device.

In the following, light projection target position calculation processing (S140) in the third embodiment is described in detail with reference to the flowchart shown in FIG. 11.

First, the PC causes the robot arm 10 to move, in a state in which the calibration plate 110 is removed, to an arbitrary robot coordinate position at which the diffuse reflection of the laser projected from the distance sensor 30 to the light projection plate 200 is projected on an image (S1421). Here, assume that the robot coordinate position is $X_{1,1}=[X_{1,1}, Y_{1,1}, Z_1]^T$. Then, the PC captures an image of illumination with a laser from the distance sensor 30 with the camera 40 (S1422), and detects the light projection position of the laser on the image (S1423). At this time, the PC sets the image coordinate value of the light projection position of the laser detected on the image to $x_{1,1}$, and stores $X_{1,1}$ and $x_{1,1}$ in the storage device (S1424).

In a similar way, without changing the Z coordinate of the robot, the robot arm 10 is sequentially moved to $X_{1,2}=[X_{1,2}, Y_{1,2}, Z_{1,2}]^T$ through $X_{1,N1}=[X_{1,N1}, Y_{1,N1}, Z_{1,N1}]^T$. Then, the PC detects image coordinate values $x_{1,2}$ to $x_{1,N1}$ of the light projection positions on the image at respective positions, and stores $X_{1,2}$ to $X_{1,N1}$ and $x_{1,2}$ to $x_{1,N1}$ in the storage device (S1421 to S1425). Here, each is set to be a state coordinates group $P_1=\{X_{1,i}|i=1 \ldots N_1\}$ and a light projection position coordinates group $S_1=\{x_{1,i}|i=1 \ldots N_1\}$. Note that $N_i$ is the number of positions to which the robot is moved when the robot Z coordinate is fixed to $Z_1$, and is set using an arbitrary integer of $N_1 \geq 3$. However, among the position vector groups of the robot coordinates set from $X_{1,1}$ to $X_{1,N1}$, three or more need to be linear independent. For example, when the number is set to be $N_1=3$, settings may be set such as $X_{1,1}=[100, 100, 100]^T$, $X_{1,2}=[100, 200, 100]^T$, and $X_{1,3}=[300, 100, 100]^T$.

Similarly, the PC fixes the robot Z coordinate to $Z_2$, and obtains $N_2$ robot coordinates $X_{2,1}$ to $X_{2,N2}$ and light projection positions $x_{2,1}$ to $x_{2,N2}$ corresponding thereto. Then, the PC stores them as a state coordinate group $P_2=\{X_{2,i}|i=1 \ldots N_2\}$ and a light projection position coordinate group $S_2=\{x_{2,i}|i=1 \ldots N_2\}$ in the storage device (S1421 to S1426).

If the flatness of the light projection plate 200 has been obtained, the light projection positions of the laser projected from the distance sensor 30 may be considered to be orthographic projections on the floor surface at corresponding robot coordinates. Therefore, using the robot coordinate group and the light projection position coordinate group that have been obtained, the following transformation equation can be obtained through similar calculation to that in the second embodiment (S1427).

$$\begin{cases} [X \quad Y \quad 1]^T = A_1[x \quad y \quad 1]^T (Z = Z_1) \\ [X \quad Y \quad 1]^T = A_2[x \quad y \quad 1]^T (Z = Z_2) \end{cases} \quad \text{[Equation 18]}$$

If the image coordinate value $x_S$ of the virtual target point is substituted in the respective right-hand sides of Equation 18, it is possible to obtain estimated values of the robot coordinates $X_{L1}$ and $X_{L2}$ at which the light projection position matches the virtual target point on the image when the robot Z coordinate is set to $Z_1$ and $Z_2$ (S1428). The PC stores the robot coordinates $X_{L1}$ and $X_{L2}$ obtained in this way in the storage device (S1429). Then, the PC gives $X_{L1}$ that is the obtained estimated value of the robot coordinates to the robot arm 10 as a movement command (S1430), and stores a measured voltage value obtained by measuring the light projection plate 200 using the distance sensor 30 as $V_1$ in the storage device (S1431). Similarly, the PC causes the robot arm 10 to move to the coordinates $X_{L2}$, and stores a voltage value measured by the distance sensor 30 at that time as $V_2$ in the storage device (S1430 to S1431). In this way, after processing has been repeated only the prescribed number of times (twice in this example), light projection target position calculation processing (S140) ends (S1432).

By performing the above processing, it is possible to obtain two robot positions at which the virtual target point and the light projection position match on the image, and similar to the first embodiment, a calibration value can be calculated in calibration value calculation processing (S150).

Fourth Embodiment

In the second and third embodiments, processing in which visual servoing is not used in light projection target position calculation processing (S140) was described. In a fourth embodiment, an example is described in which work reference point target position calculation processing (S130) is realized without using visual servoing.

Specifically, the PC obtains a plurality of pairs of coordinates of the work reference point and coordinates of the moving work unit 1 at that time (robot coordinates) on an image captured with the camera 40. Then, based on the obtained plurality of pairs of coordinates, the coordinates (robot coordinates) of the moving work unit 1 at which the virtual target point and the work reference point match on the image are estimated.

In the following, in the robot system having a similar configuration to that in the first embodiment as shown in FIG. 2, a configuration is described in which $X_{H1}$ and $X_{H2}$ are obtained through work reference point target position calculation processing (S130) performed using the calibration plate 110 as shown in FIG. 5A, and calibration is performed.

In work reference point target position calculation processing (S130) in the fourth embodiment, in a state in which the calibration plate 110 is attached, the PC causes the robot arm 10 to move to three or more positions in the same plane in the robot coordinate system. Then, the PC detects the position of the marker 111 on the calibration plate at the respective positions on the image captured by the camera 40, and stores, in the storage device, the obtained positions of the work reference point 100 in the captured image, and the robot coordinate values corresponding thereto. The PC also performs similar processing to that described above regarding three or more positions in the same plane, which is different from the above plane, in the robot coordinate system. In other words, the image coordinates of the work reference point 100 obtained by detecting the marker 111 on the captured image, and the robot coordinate values corresponding thereto are stored in the storage device of the PC. From respective coordinate transformation matrices obtained in this way in two planes, the PC estimates values of robot coordinates at which the work reference point 100 and the virtual target point match in both planes, and stores the estimated robot coordinate values in the storage device.

Figure 12:
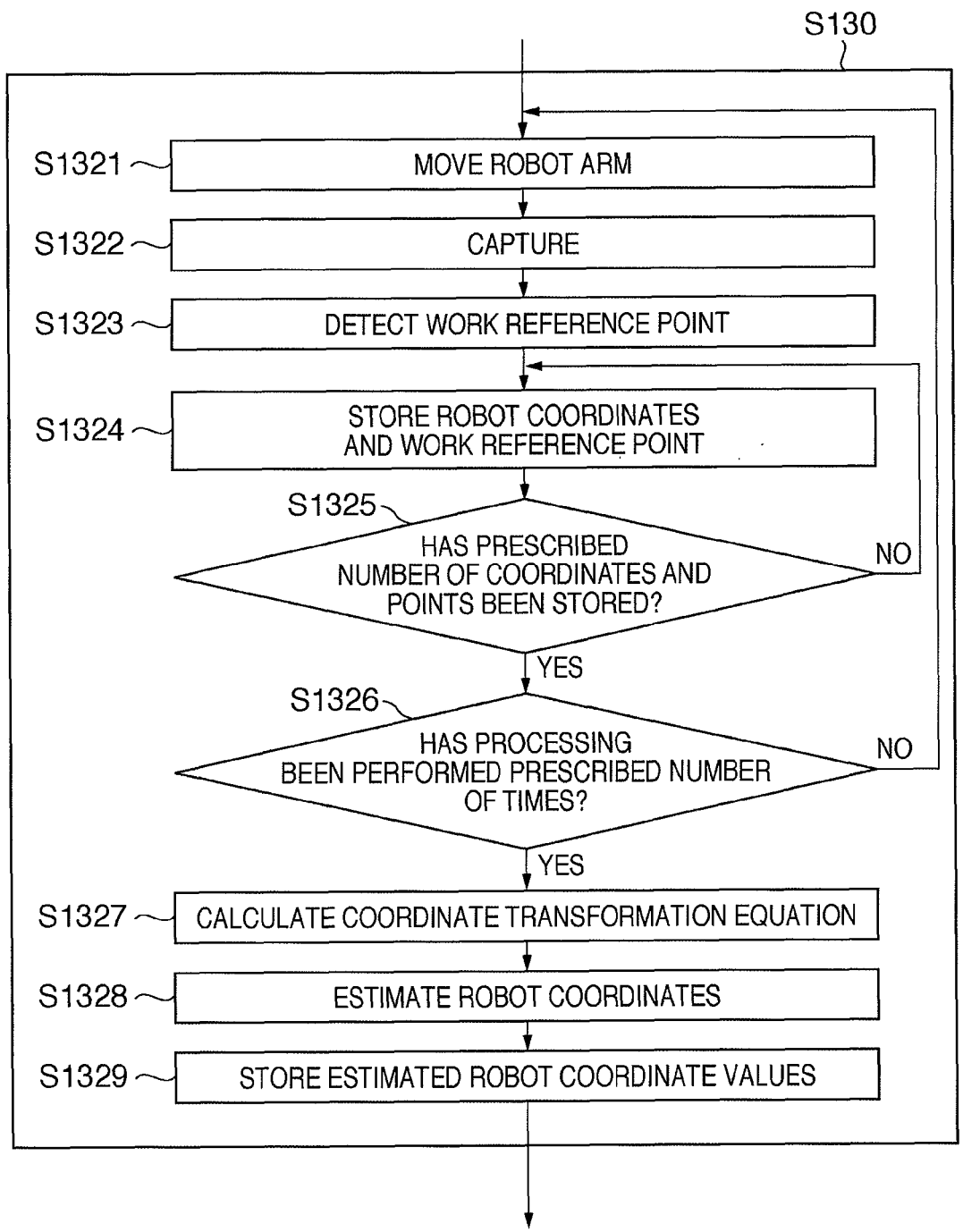
FIG. 12 is a flowchart showing the details of work reference point target position calculation processing in a fourth embodiment.

In the following, work reference point target position calculation processing (S130) in the fourth embodiment is described in detail with reference to the flowchart shown in FIG. 12.

First, in a state in which the calibration plate 110 is attached, the PC causes the robot arm 10 to move to an arbitrary robot coordinate position at which the marker 111 is projected on an image (S1321). Here, assume that the robot coordinate position is $X_{1,1}=[X_{1,1}, Y_{1,1}, Z_1]^T$. The PC captures the working area 50 with the camera 40 (S1322), and detects the work reference point 100 that is the center of the marker 111 from the captured image (S1323). At this time, the PC sets the image coordinates of the work reference point 100 detected on the image to $x_{1,1}$, and stores $X_{1,1}$ and $x_{1,1}$ in the storage device (S1324). In a similar way, without changing the Z coordinate of the robot, the robot arm 10 is sequentially moved to $X_{1,2}=[X_{1,2}, Y_{1,2}, Z_{1,2}]^T$ through $X_{1,N1}=[X_{1,N1}, Y_{1,N1}, Z_{1,N1}]^T$. Then, the PC detects image coordinate values $x_{1,2}$ to $x_{1,N1}$ of the work reference point 100 at the respective positions, and stores $X_{1,2}$ to $X_{1,N1}$, and $x_{1,2}$ to $x_{1,N1}$ in the storage device (S1321 to S1325). Here, each is set to be a state coordinates group $P_1=\{X_{1,i}|i=1 \ldots N_1\}$ and a work reference point coordinate group $S_1=\{x_{1,i}|i=1 \ldots N_1\}$. Here, $N_1$ is the number of positions to which the robot is moved when the robot Z coordinate is fixed to $Z_1$, and is set using an arbitrary integer of $N_1 \geq 3$. However, among the position vector groups of the robot coordinates set from $X_{1,1}$ to $X_{1,N1}$, three or more need to be linear independent. For example, when the number is set to be $N_1=3$, settings may be set such as $X_{1,1}=[100, 100, 100]^T$, $X_{1,2}=[100, 200, 100]^T$, and $X_{1,3}=[300, 100, 100]^T$.

Similarly, the PC fixes the robot Z coordinate to $Z_2$, and obtains $N_2$ robot coordinates $X_{2,1}$ to $X_{2,N2}$ and image coordinate values $x_{2,1}$ to $x_{2,N2}$ corresponding thereto. Then, the PC stores them as a state coordinate group $P_2=\{X_{2,i}|i=1 \ldots N_2\}$ and a work reference point coordinate group $S_2=\{x_{2,i}|i=1 \ldots N_2\}$ in the storage device (S1321 to S1326).

Robot coordinate points that belong to the respective state coordinate groups $P_1$ and $P_2$ are in the same planes, respectively. Accordingly, the work reference point coordinate groups $S_1$ and $S_2$ that are orthographic projections on the image plane of the work reference point 100 are in a linear transformation relationship with robot coordinate groups that respectively correspond thereto. Therefore, using the obtained robot coordinate groups and work reference point coordinate groups, through similar calculation to that for obtaining a transformation equation of the light projection position and the robot coordinates in the second embodiment, the following transformation equation can be obtained (S1327).

$$\begin{cases} [X \ Y \ 1]^T = A_1[x \ y \ 1]^T (Z=Z_1) \\ [X \ Y \ 1]^T = A_2[x \ y \ 1]^T (Z=Z_2) \end{cases}$$ [Equation 19]

If the image coordinate value $x_S$ of the virtual target point is substituted in the respective right-hand sides of Equation 19, it is possible to obtain estimated values of the robot coordinates $X_{H1}$ and $X_{H2}$ at which the work reference point 100 matches the virtual target point on an image when the robot Z coordinate is set to $Z_1$ and $Z_2$ (S1328). The PC stores these estimated values in the storage device (S1329).

By performing the above processing, it is possible to obtain two robot positions at which the virtual target point and the work reference point 100 match on an image. Therefore, by performing similar processing to that in the first embodiment, the second embodiment, or the third embodiment after this processing, light projection target position calculation processing (S140) is implemented, and a calibration value can be calculated through calibration value calculation processing (S150) similar to that in the first embodiment.

Fifth Embodiment

In work reference point target position calculation processing (S130) and light projection target position calculation processing (S140) in the first embodiment to the fourth embodiment, two robot coordinates are determined at which the work reference point 100 matches the virtual target point, and two robot coordinates are determined at which the light projection position matches the virtual target point. However, in these processes, by obtaining three or more robot coordinates at which the work reference point 100 and the light projection position match the virtual target point, a calibration value with fewer errors can be obtained. In a fifth embodiment, a description is given regarding processing for obtaining such three or more robot coordinate values so as to obtain a calibration value.

In work reference point target position calculation processing (S130), for different robot Z coordinates $Z_1$ to $Z_K$ ($Z_1 < Z_2 < \ldots < Z_K$, $K \geq 3$), the robot coordinates $X_{H1}$ to $X_{HK}$ are obtained at which the work reference point 100 and the virtual target point match on an image. Visual servoing described in the first embodiment can be used in work reference point target position calculation processing (S130).

Alternatively, work reference point target position calculation processing described in the fourth embodiment may be used. In other words, for different robot Z coordinates $Z_1$ to $Z_K$ ($Z_1 < Z_2 < \ldots < Z_K$, $K \geq 3$), state coordinate groups $P_{H1}$ to $P_{HK}$ and work reference point coordinate groups $S_{H1}$ to $S_{HK}$ are collected. Then, from these observed values, estimated values of the robot coordinates $X_{H1}$ to $X_{HK}$ are obtained at which the work reference point 100 and the virtual target point match on the image when the robot Z coordinate is $Z_1$ to $Z_K$.

Further, in light projection target position calculation processing (S140), for robot Z coordinates $Z_1$ to $Z_K$ common to the above work reference point target position calculation processing, using visual servoing, robot coordinates $X_{L1}$ to $X_{LK}$ are obtained at which the light projection position and the virtual target point match on the image.

Alternatively, light projection target position calculation processing (S140) in the second embodiment or the third embodiment may be used. In other words, for the abovementioned robot Z coordinates $Z_1$ to $Z_K$, state coordinate groups $P_{L1}$ to $P_{LK}$ and light projection position coordinate groups $S_{L1}$ to $S_{LK}$ are collected. Then, from these observed values, estimated values of robot coordinates $X_{L1}$ to $X_{LK}$ are obtained at which the light projection position and the virtual target point match on the image when the robot Z coordinate is $Z_1$ to $Z_K$.

Using robot coordinate points $X_{H1}$ to $X_{HK}$, and $X_{L1}$ to $X_{LK}$ obtained using any of the above methods, $X_{H0}$ and $X_{L0}$ are obtained as follows, instead of using Equation 5 to Equation 11 in the first embodiment.

A straight line connecting robot coordinate points $X_{H1}$ to $X_{HK}$ is a straight line indicating a robot coordinate set according to which the robot can move with the work reference point 100 on the image maintained at the virtual target point $x_S$. Assuming that the direction vector of this straight line $l_H$ is H, the vectorial equation of $l_H$ is expressed as follows.

$$X = X_H + tH \quad \text{[Equation 20]}$$

Here, $X_H$ is one arbitrary point on the straight line, and t is a real parameter. However, since $X_{H1}$ to $X_{HK}$ include a quantization error due to image resolution, a detection error of the marker 111, or the like, and normally, do not exist on one straight line completely, a linear equation is calculated as an approximate solution. First, a covariance matrix $C_H$ (3×3 matrix) of $X_{H1}$ to $X_{HK}$ is obtained.

$$C_H = \frac{1}{K}\sum_{k=1}^{K}(X_{Hk} - \overline{X}_H)(X_{Hk} - \overline{X}_H)^T \quad \text{[Equation 21]}$$

Since the covariance matrix $C_H$ is a symmetric matrix, through eigenvalue decomposition of this, $C_H$ can be obtained as follows.

$$C_H = \Psi \lambda \Psi^T \quad \text{[Equation 22]}$$

Here, $\lambda$ is a matrix that has eigenvalues $\lambda_1$, $\lambda_2$, and $\lambda_3$ as diagonal components, and $\Psi$ is a matrix that has eigenvectors $\psi_1$, $\psi_2$, and $\psi_3$ corresponding to each eigenvalue, as components.

$$\Lambda = \begin{bmatrix} \lambda_1 & 0 & 0 \\ 0 & \lambda_2 & 0 \\ 0 & 0 & \lambda_3 \end{bmatrix} \quad \text{[Equation 23]}$$

$$\Psi = [\psi_1 \quad \psi_2 \quad \psi_3] \quad \text{[Equation 24]}$$

Since the axis that minimizes a mean square error of point sets $X_{H1}$ to $X_{HK}$ is equal to the principal axis obtained through principal component analysis, a direction vector H of the straight line is set to be an eigenvector corresponding to the maximum eigenvalue. In other words, assuming Equation 25A below, the direction vector H is obtained as shown in Equation 25B below.

$$c = \underset{d}{\operatorname{argmax}}(\lambda_d) \quad \text{[Equation 25A]}$$

$$H = \psi_c \quad \text{[Equation 25B]}$$

Further, the arbitrary point $X_H$ on the straight line is set to be the mean vector of $X_{H1}$ to $X_{HK}$.

$$X_H = \frac{1}{K}\sum_{k=1}^{K} X_{Hk} \quad \text{[Equation 26]}$$

An equation of the straight line $l_H$ can be obtained using these Equations 25B and 26.

Similarly, the straight line connecting the robot coordinate points $X_{L1}$ to $X_{LK}$ is a straight line expressing the robot coordinate set according to which the robot can move with the light projection position on the image maintained at the virtual target point $x_S$. Assuming that the direction vector of this straight line $l_1$ is L, the vectorial equation of $l_L$ is expressed as follows.

$$X = X_L + sL \quad \text{[Equation 27]}$$

Here, $X_L$ is one arbitrary point on the straight line, and s is a real parameter. However, since $X_{L1}$ to $X_{LK}$ include a quantization error due to image resolution, a light projection position detection error, or the like, and normally, do not exist on one straight line completely, a linear equation of $l_L$ is calculated as an approximate solution. Similar to when obtaining the linear equation of Equation 20, the linear equation of Equation 27 can be obtained by obtaining L and $X_L$ from eigenvalue decomposition of the covariance matrix of $X_{L1}$ to $X_{LK}$ and the mean vector thereof.

Here, assume that when $Z=Z_K$, the point through which the straight line $l_H$ passes is $\hat{X}_{HK}$, and the point that the straight line $l_L$ passes is $\hat{X}_{LK}$. Note that in the following, it is assumed that $\hat{X}$ expresses X.

For both $\hat{X}_{HK}$ and $\hat{X}_{LK}$, it is known that $Z=Z_K$, and therefore if $Z_K$ is substituted as the Z coordinate of X in the respective linear equations, and the equations are solved regarding the Z coordinate, the values of the real parameters t and s can be obtained. Then, X and Y coordinates of $\hat{X}_{HK}$ and $\hat{X}_{LK}$ can thereby be obtained. A point $\hat{X}_{H1}$ through which the straight line $l_H$ passes and a point $\hat{X}_{L1}$ through which the straight line $l_L$ passes when $Z=Z_I$ are obtained in a similar way. Movement commands $\hat{X}_{L1}$ and $\hat{X}_{LK}$ are given to the robot arm 10 so as to cause the robot arm 10 to move thereto, and the voltage value obtained at respective positions from the distance sensor 30 are set to be $\hat{V}_1$ and $\hat{V}_K$. Then, it is possible to obtain the proportionality constant n for converting a voltage value from the distance sensor 30 into distance in a robot coordinate system scale as follows.

$$\eta = \frac{\|\hat{X}_{L1} - \hat{X}_{LK}\|}{\hat{V}_1 - \hat{V}_K} \quad \text{[Equation 28]}$$

Further, the virtual position $X_{L0}$ is estimated as follows at which the robot arm 10 was lowered, with the light projection position on the image maintained at the virtual target point $x_S$, so as to cause the work reference plane 112 to match the height of the position at which the laser is projected.

$$X_{L0} = \hat{X}_{LK} + \eta(\hat{V}_K - V_B)L \quad \text{[Equation 29]}$$

Next, consider that a vectorial equation of the straight line $l_L$ has the same value even expressed as follows.

$$X_{H0} = X_{HK} + l_{HK \to H0} H \quad \text{[Equation 30]}$$

Here, an amount of movement $l_{HK \to H0}$ is assumed to be the amount of movement from $\hat{X}_{HK}$ to $\hat{X}_{H0}$. Since the ratio of the amount of movement $l_{HK \to H0}$ to the amount of movement from $\hat{X}_{H1}$ to $\hat{X}_{HK}$ is equal to the ratio of the amount of movement from $\hat{X}_{LK}$ to $X_{L0}$ to the amount of movement from $\hat{X}_{L1}$ to $\hat{X}_{LK}$, $l_{HK \to H0}$ is obtained as follows.

$$l_{Hk \to H0} = \frac{\|X_{L0} - \hat{X}_{LK}\|}{\|\hat{X}_{LK} - \hat{X}_{L1}\|} \|\hat{X}_{HK} - \hat{X}_{H1}\| \quad \text{[Equation 31]}$$

Therefore, $X_{H0}$ is calculated as follows.

$$X_{H0} = \frac{\|X_{L0} - \hat{X}_{L1}\|}{\|\hat{X}_{LK} - \hat{X}_{L1}\|}\hat{X}_{HK} - \frac{\|X_{L0} - \hat{X}_{LK}\|}{\|\hat{X}_{LK} - \overline{X}_{L1}\|}\hat{X}_{H1} \quad \text{[Equation 32]}$$

Since the offset amount W is equal to the relative positional relationship between $X_{H0}$ and $X_{L0}$, W is obtained as follows.

$$W = X_{H0} - X_{L0} \quad \text{[Equation 33]}$$

The PC stores the bias voltage $V_B$, the proportionality constant η, the sensor offset amount W, and the laser-optical-axis normalization direction vector L that are obtained as described above in the storage device, and ends calibration work.

Sixth Embodiment

Figure 14:
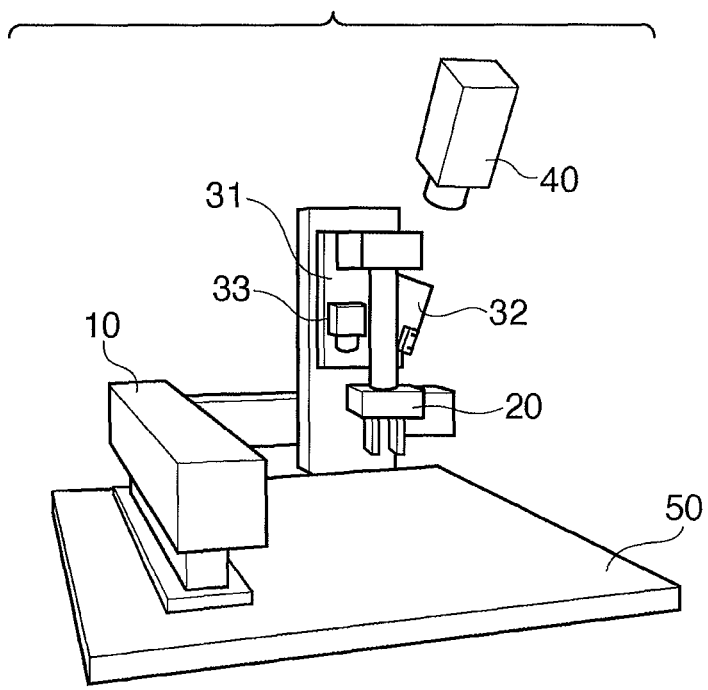
FIG. 14 is a diagram showing the configuration of a work apparatus in a sixth embodiment.

FIG. 14 shows a specific apparatus configuration in a sixth embodiment suitable for implementing the present invention.

A movable robot arm 10 is fixed to a working area 50. A hand base plate 31 is placed in a portion where an end effector of the robot arm 10 is attached, and a robot hand 20 is fixed to the hand base plate 31. These correspond to the moving work unit 1 shown in FIG. 1. Furthermore, a projector 33 for pattern light projection and a light projection pattern capturing camera 32 are fixed to the hand base plate 31. When the end effector of the robot arm 10 moves, the end effector operates such that the relative positional relationship between the robot hand 20, the projector 33, and the light projection pattern capturing camera 32 does not change via the hand base plate 31. Here, the projector 33 and the light projection pattern capturing camera 32 are for measuring distance information using a spatial coding method, and correspond to the distance information obtaining unit 2 shown in FIG. 1. Spatial coding is a method for obtaining distance by projecting different patterns from a projector to a target to be measured over multiple frames, and encoding each projection line in the space with binary code.

The projector 33 and the light projection pattern capturing camera 32 are connected to the PC. From images obtained by the light projection pattern capturing camera 32 capturing a plurality of patterns of light projected by the projector 33, the PC analyzes the binary code at each position on the image, and obtains a distance measurement value. The robot arm 10 is connected to a robot controller (not shown), and operates in accordance with an operation signal from the robot controller. The PC and the robot controller correspond to the processing unit 3 shown in FIG. 1. A camera 40 corresponding to the imaging apparatus 4 shown in FIG. 1 is placed in the space above the robot, and captures the working area 50. The camera 40 is connected to the PC described above, and prescribed processing is performed on images acquired from the camera 40 using a program that operates on the PC. The robot controller and the PC are connected, and a command can be transmitted to the robot arm 10 from the robot controller in accordance with instructions from the PC.

In this apparatus configuration, the present invention is implemented using methods such as the following. Note that processing from the start of calibration work to work reference point target position calculation processing (S130) is implemented using a similar method to that in the embodiments described above. Hereinafter, light projection target position calculation processing (S140) in the sixth embodiment is described with reference to the flowchart shown in FIG. 15.

First, the PC causes the robot arm 10 to move to arbitrary positions at which the Z coordinate of the robot coordinate system is fixed to $Z_1$ (S1441), synchronizes the camera 40 and the projector 33, and captures a necessary number of frames for encoding (S1442). The PC detects a binary code b assigned to the optical axis center of the projector from the image obtained by the camera 40 (S1443), and based on the detection result, causes the robot arm 10 to move such that the light projection position that is the binary code b matches the virtual target point. For movement in order to cause the light projection position that is the binary code b to match the virtual target point, feature based visual servoing or the like is used, similar to the first embodiment.

Subsequently, the PC calculates an image Jacobian by calculating a movement vector of the light projection position in the image coordinate system with respect to a movement vector of the robot arm 10 in the robot coordinate system in the previous frame (S1444). Then, the PC causes the robot arm 10 to move in the direction in which the difference vector is smaller, from a difference vector between the virtual target point $x_S$ and the light projection position on the image, and the obtained image Jacobian (S1445). The PC again synchronizes the camera 40 and the projector 33, and captures a necessary number of frames for encoding (S1446). Then, the PC detects the binary code b assigned to the optical axis center of the projector from the image obtained by the camera 40 (S1447). The PC compares the Euclidean distance on the image between the virtual target point $x_S$ and the light projection position with a threshold value $\epsilon_L$ (for example, $\epsilon_L$=0.5 [pixels]) (S1448), and if the Euclidean distance is greater than the threshold value $\epsilon_L$, the processing will return to S1444.

If the above Euclidean distance is smaller than the threshold value $\epsilon_L$, the PC determines that the virtual target point $x_S$ and the light projection position have matched on the image, and stores the robot coordinates at this time as $X_{L1}$ in the storage device (S1449). Also, the PC stores distance information at the light projection position that is the binary code b as $V_1$ in the storage device (S1450).

Similarly, the PC changes the Z coordinate of the robot coordinate system to $Z_2$ so as to change the height of the robot arm 10, causes the robot arm 10 to move, and detects the light projection position that is binary code equal to b on the image. Then, based on the detection result, the PC causes the robot arm 10 to move such that the light projection position that is the binary code b matches the virtual target point. Then, the PC causes the storage device to store robot coordinates when the light projection position and the virtual target point match as $X_{L2}$, and distance information at the light projection position that is the binary code b as $V_2$ (S1441 to S1450). After the above processing has been repeated a prescribed number of times (twice in this example), the PC ends light projection target position calculation processing (S140), considering that measurement of robot coordinates and distance has ended (S1451).

Note that if the working area 50 has flatness as in the second embodiment, or if the light projection plate 200 having flatness is put on the working area 50 as in the third embodiment, light projection target position calculation processing (S140) can also be performed as follows.

As shown in the flowchart in FIG. 16, first, the PC causes the robot arm 10 to move to an arbitrary position in which the Z coordinate of the robot coordinate system is $Z_1$ (S1461). Subsequently, the PC synchronizes the camera 40 and the projector of the distance sensor 30, and captures a necessary number of frames for encoding (S1462), and detects the binary code b indicating the optical axis center of the projector from the image (S1463). The PC performs similar processing regarding three or more robot coordinates at which the Z coordinate of the robot coordinate system is $Z_1$, and sets these robot coordinates to the state coordinate group $P_1$. Then, the image coordinate positions at which the binary code b was detected, and which correspond to these robot coordinates are set to be the light projection position coordinate group $S_1$ (S1461 to S1465).

Similarly, the PC sets three or more arbitrary robot coordinate points in which the height of the robot arm 10 is set to $Z_2$, which is the Z coordinate of the robot coordinate system, as the state coordinate group $P_2$. Then, the image coordinate positions at which the binary code b was detected are set to be the light projection position coordinate group $S_2$ (S1461 to S1466). The PC calculates, from these state coordinate groups $P_1$ and $P_2$, and light projection position coordinate groups $S_1$ and $S_2$, a coordinate transformation equation similar to Equation 17 through similar calculation to that in the second embodiment (S1467). Then, the PC calculates estimated values of robot coordinates $X_{L1}$ and $X_{L2}$ when the position of the binary code b matches the virtual target point (S1468), and stores the results in the storage device (S1469). Then, the PC causes the robot arm 10 to move to the calculated robot coordinates $X_{L1}$ (S1470), and stores distance information at the position corresponding to the binary code b as $V_1$ in the storage device (S1471). Similarly, the PC also causes the robot arm to move to the robot coordinates $X_{L2}$, causes the storage device to store distance information at the position corresponding to the binary code b as $V_2$ (S1472), and ends light projection target position calculation processing (S140).

Further, in light projection target position calculation processing (S140), it is obvious that a calibration value with fewer errors can also be obtained, by obtaining three or more robot coordinates at which the light projection position and the virtual target point match, in a similar way to the fifth embodiment. After that, in calibration value calculation processing (S150), the PC calculates a calibration value in a similar way to the first embodiment, and ends calibration work.

As described above, according to the embodiments, regarding the distance sensor placed at an arbitrary position of the robot arm with arbitrary attachment accuracy, it is possible to contactlessly and automatically calculate the optical-axis direction of the distance sensor and the offset amount in the robot coordinate system as calibration values.

According to the present invention, it is possible to contactlessly and automatically obtain a calibration parameter for the work unit and the distance measurement unit that the work apparatus has.

Other Embodiments

The present invention, embodiments of which have been described above in detail, can be embodied as, for example, a system, an apparatus, a method, a program, or a storage medium. Specifically, the present invention may be applied to a system constituted from a plurality of devices, and may be applied to an apparatus constituted from one device.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-328661, filed Dec. 24, 2008, which is hereby incorporated by reference herein in its entirety.

What is claimed is:

1. A calibration method for an apparatus comprising a work unit, a distance information obtaining unit configured to move together with the work unit, and an imaging apparatus fixed independently from the work unit, the method comprising:
   an obtaining step of obtaining a first position of the work unit when a target point on an image plane in the imaging apparatus matches with a reference point of the work unit on the image plane and obtaining a second position of the work unit when the target point on the image plane matches with a position on which a light is projected by the distance information obtaining unit on the image plane; and
   a calculating step of calculating a calibration parameter which calibrates a position of the reference point relative to the distance information obtaining unit based on the first and second positions of the work unit obtained in the obtaining step.

2. The method according to claim 1,
   wherein the reference point is a position at which the work unit performs work, and is a point that moves together with the distance information obtaining unit when the work unit moves.

3. The method according to claim 1,
   wherein in the obtaining step, the work unit moves to a plurality of states in which the reference point matches the target point on the image plane.

4. The method according to claim 1,
   wherein in the obtaining step, the work unit moves to a plurality of states in which a position of the light projected by the distance information obtaining unit matches the target point on the image plane, and distance information is obtained by the distance information obtaining unit in the plurality of states, and
   wherein in the calculating step, the calibration parameter is calculated based on the first and second positions and the distance information obtained in the obtaining step.

5. The method according to claim 1,
   wherein the calibration parameter are an optical-axis direction of the distance information obtaining unit, and a relative position of the distance information obtaining unit and the reference point.

6. The method according to claim 1,
   wherein in the obtaining step, a plurality of pairs of a coordinate value of the reference point in the image plane, and a coordinate value of the work unit at that time are obtained, and based on the obtained plurality of pairs of coordinate values, a plurality of coordinate values of the work unit at which the reference point is caused to match the target point on the image plane are estimated as the first position.

7. The method according to claim 6,
   wherein in the obtaining step, based on the plurality of pairs of coordinate values, a coordinate value of the work unit, at which the reference point matches the target point on the image plane is estimated as the first position using a least-square method.

8. The method according to claim 4,
   wherein in the obtaining step,
   a plurality of pairs of a coordinate value of the position of the light projected by the distance information obtaining unit on the image plane, and a coordinate value of the work unit at that time are obtained, and based on the obtained plurality of pairs of coordinate values, a plurality of coordinate values of the work unit at which the light projection position is caused to match the target point on the image plane are estimated as the second position, and the work unit moves to each of the estimated plurality of coordinate values, and distance information is obtained by the distance information obtaining unit.

9. The method according to claim 8, wherein in the obtaining step, from the plurality of pairs of coordinate values, a coordinate value of the work unit at which the position of the light projected by the distance information obtaining unit matches the target point on the image plane is estimated using a least-square method.

10. The method according to claim 4, wherein in the obtaining step, a straight line that connects the plurality of coordinate values obtained as the first position is obtained by approximation by principal component analysis, and a coordinate value to be used in the calculating step is obtained based on the straight line, and in the obtaining step, a straight line that connects the plurality of coordinate values obtained as the second position is obtained by approximation by principal component analysis, a coordinate value to be used in the calculating step is obtained based on the straight line, and distance information to be used in the calculating step is distance information obtained from the distance information obtaining unit when the moving unit was moved to the coordinate value to be used in the calculating step.

11. An apparatus comprising a work unit, a distance information obtaining unit configured to move together with the work unit, and an imaging apparatus fixed independently from the work unit, the apparatus comprising:

an obtaining unit configured to obtain a first position of the work unit when a target point on an image plane in the imaging apparatus matches with a reference point of the work unit on the image plane and obtain a second position of the work unit when the target point on the image plane matches with a position on which a light is projected by the distance information obtaining unit on the image plane; and a calculation unit configured to calculate a calibration parameter which calculates a position of the reference point relative to the distance information obtaining unit based on the first and second positions of the work unit obtained by the obtaining unit.

12. A non-transitory computer-readable storage medium storing a computer program for causing a computer to execute the calibration method for the work apparatus according to claim 1.

13. A calibration method for an apparatus comprising a work unit, a distance information obtaining unit configured to move together with the work unit, and an imaging apparatus, the method comprising:

an obtaining step of obtaining a position of the work unit when a target point on an image plane in the imaging apparatus matches with a position on which a light is projected by the distance information obtaining unit on the image plane; and a calculating step of calculating, a calibration parameter which calibrates a position of a reference point of the work unit relative to the distance information obtaining unit, based on the position of the work unit obtained in the obtaining step and a position of the work unit relative to the imaging apparatus, which is known.

* * * * *